US008315322B2

(12) United States Patent
Oshikiri

(10) Patent No.: US 8,315,322 B2
(45) **Date of Patent: *Nov. 20, 2012**

(54) SPECTRUM CODING APPARATUS, SPECTRUM DECODING APPARATUS, ACOUSTIC SIGNAL TRANSMISSION APPARATUS, ACOUSTIC SIGNAL RECEPTION APPARATUS AND METHODS THEREOF

(75) Inventor: Masahiro Oshikiri, Yokosuka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/088,392

(22) Filed: Apr. 17, 2011

(65) Prior Publication Data

US 2011/0196686 A1 Aug. 11, 2011

Related U.S. Application Data

(63) Continuation of application No. 10/576,270, filed as application No. PCT/JP2004/016176 on Oct. 25, 2004, now Pat. No. 7,949,057.

(30) Foreign Application Priority Data

Oct. 23, 2003 (JP) ................................ 2003-363080

(51) Int. Cl.
*H04L 27/28* (2006.01)

(52) U.S. Cl. ........................................................ 375/260

(58) Field of Classification Search .................. 375/260; 704/207

See application file for complete search history.

(56) References Cited

U.S. PATENT DOCUMENTS

| | | | |
|---|---|---|---|
| 5,893,068 A | 4/1999 | Hasegawa | |
| 6,141,637 A * | 10/2000 | Kondo | 704/204 |
| 6,345,246 B1 * | 2/2002 | Moriya et al. | 704/219 |
| 6,680,972 B1 | 1/2004 | Liljeryd | |
| 2001/0044727 A1 * | 11/2001 | Nakatoh et al. | 704/500 |
| 2002/0152085 A1 | 10/2002 | Tsushima | |
| 2003/0093271 A1 | 5/2003 | Tsushima | |
| 2003/0125889 A1 | 7/2003 | Sato | |
| 2003/0171916 A1 | 9/2003 | Kamba | |
| 2004/0028125 A1 | 2/2004 | Sato | |
| 2004/0028244 A1 | 2/2004 | Tsushima | |
| 2007/0083362 A1 | 4/2007 | Moriya | |

(Continued)

FOREIGN PATENT DOCUMENTS

EP 1 351 218 10/2003

(Continued)

OTHER PUBLICATIONS

PCT International Search Report dated Mar. 8, 2005.

(Continued)

*Primary Examiner* — Don N Vo
(74) *Attorney, Agent, or Firm* — Dickinson Wright PLLC

(57) ABSTRACT

A spectrum coding apparatus capable of performing coding at a low bit rate and with high quality is disclosed. This apparatus is provided with a section that performs the frequency transformation of a first signal and calculates a first spectrum, a section that converts the frequency of a second signal and calculates a second spectrum, a section that estimates the shape of the second spectrum in a band of FL≦k<FH using a filter having the first spectrum in a band of 0≦k<FL as an internal state and a section that codes an outline of the second spectrum determined based on a coefficient indicating the characteristic of the filter at this time.

18 Claims, 30 Drawing Sheets

U.S. PATENT DOCUMENTS

| | | | |
|---|---|---|---|
| 2009/0190649 | A1 | 7/2009 | Tonietto |
| 2010/0067567 | A1 | 3/2010 | Ghiasi |

FOREIGN PATENT DOCUMENTS

| | | | |
|---|---|---|---|
| JP | 685607 | | 3/1994 |
| JP | 6350401 | | 12/1994 |
| JP | 8123495 | | 5/1996 |
| JP | 990992 | | 4/1997 |
| JP | 9258787 | | 10/1997 |
| JP | 2001/521648 | | 11/2001 |
| JP | 2001/356788 | | 12/2001 |
| JP | 2002/41089 | | 2/2002 |
| JP | 2002/132298 | | 5/2002 |
| JP | 2002/175092 | | 6/2002 |
| JP | 2002/328699 | | 11/2002 |
| JP | 2003/255997 | | 9/2003 |
| WO | 01/56021 | | 8/2001 |
| WO | WO 01/56021 | * | 8/2001 |
| WO | 03/003345 | | 1/2003 |
| WO | 03/007480 | | 1/2003 |
| WO | 03/019533 | | 3/2003 |

OTHER PUBLICATIONS

Chinese Office Action dated Jul. 18, 2008.

Supplementary European Search Report dated Jul. 15, 2008.

M. Oshikiri, et al, "Efficient Spectrum Coding for Super-Wideband Speech and its Application to 7/10/15 KHz Bandwidth Scalable Coders," Acoustics, Speech, and Signal Processing, 2004, Proceedings (ICASSP '04). IEEE International Conference on Montreal, Quebec, Canada, vol. 1, May 17, 2004, pp. 481-484.

Japanese Notice of Reasons for Rejection dated Nov. 24, 2010.

European Office Action dated Jan. 11, 2012.

* cited by examiner

INTENSITY
FL
FREQUENCY

ADJUSTMENT OF SPECTRAL OUTLINE
INTENSITY
FL
FH
FREQUENCY

INTENSITY
FH
FREQUENCY

SUBSTITUTION
INTENSITY
FL
FH
FREQUENCY

SPECTRUM CODING APPARATUS, SPECTRUM DECODING APPARATUS, ACOUSTIC SIGNAL TRANSMISSION APPARATUS, ACOUSTIC SIGNAL RECEPTION APPARATUS AND METHODS THEREOF

This is a continuation application of application Ser. No. 10/576,270 filed Apr. 18, 2006, which is a national stage of PCT/JP2004/016176 filed Oct. 25, 2004, which is based on Japanese Application No. 2003-363080 filed Oct. 23, 2003, the entire contents of each which are incorporated by reference herein.

TECHNICAL FIELDS

The present invention relates to a method of extending a frequency band of an audio signal or voice signal and improving sound quality, and further to a coding method and decoding method of an audio signal or voice signal applying this method.

BACKGROUND ART

A voice coding technique and audio coding technique which compresses a voice signal or audio signal at a low bit rate are important for the effective utilization of a transmission path capacity of radio wave or the like in a mobile communication and a recording medium.

Voice coding for coding a voice signal includes schemes such as G726 and G729 standardized in the ITU-T (International Telecommunication Union Telecommunication Standardization Sector). These schemes target narrow band signals (300 Hz to 3.4 kHz) and can perform high quality coding at 8 kbits/s to 32 kbits/s. However, because such a narrow band signal has a frequency band as narrow as a maximum of 3.4 kHz, and as for quality, sound is muffled and lacks a sense of realism.

On the other hand, in the field of voice coding, there is a scheme which targets a wideband signal (50 Hz to 7 kHz) for coding. Typical examples of such a method include G722, G722.1 of the ITU-T and AMR-WB of the 3GPP (The 3rd Generation Partnership Project) and so on. These schemes can perform coding on a wideband voice signal at a bit rate of 6.6 kbits/s to 64 kbits/s. When the signal to be coded is a voice, a wideband signal has relatively high quality, but it is not sufficient when an audio signal is the target or when a quality with a high sense of realism is required for the voice signal.

Generally, when a maximum frequency of a signal is approximately 10 to 15 kHz, a sense of realism equivalent to that of FM radio is obtained and quality comparable to that of a CD is obtained if the frequency is on the order of 20 kHz. Audio coding represented by the layer 3 scheme and the AAC scheme standardized in MPEG (Moving Picture Expert Group) and so on is suitable for such a signal. However, in case of these audio coding schemes, the bit rate increases because the frequency band to be coded is widened.

The National Publication of International Patent Application No. 2001-521648 describes a technique of reducing an overall bit rate by dividing an input signal into a low-frequency band and a high-frequency band and substituting the high-frequency band by a low-frequency band spectrum as the method of coding a wideband signal at a low bit rate and with high quality. The state of processing when this conventional technique is applied to an original signal will be explained using FIGS. 1A to D. Here, a case where a conventional technique is applied to an original signal will be explained to facilitate explanations. In FIGS. 1A to D, the horizontal axis shows a frequency and the vertical axis shows a logarithmic power spectrum. Furthermore, FIG. 1A shows a logarithmic power spectrum of the original signal when a frequency band is limited to $0 \leqq k < FH$, FIG. 1B shows a logarithmic power spectrum when the band of the same signal is limited to $0 \leqq k < FL$ ($FL < FH$), FIG. 1C shows a case where a spectrum in a high-frequency band is substituted by a spectrum in a low-frequency band using the conventional technique and FIG. 1D shows a case where the substituted spectrum is reshaped according to spectral outline information. According to the conventional technique, the spectrum of the original signal (FIG. 1A) is expressed based on a signal having a spectrum of $0 \leqq k < FL$ (FIG. 1B), and therefore the spectrum of the high-frequency band ($FL \leqq K < FH$ in this figure) is substituted by the spectrum of the low-frequency band ($0 \leqq k < FL$) (FIG. 1C). For simplicity, a case assuming that there is a relationship of $FL = FH/2$ is explained. Next, the amplitude value of the substituted spectrum in the high-frequency band is adjusted according to the spectrum envelope information of the original signal and a spectrum obtained by estimating the spectrum of the original signal is determined (FIG. 1D).

DISCLOSURE OF INVENTION

Generally, the spectrum of a voice signal or an audio signal is known to have a harmonic structure in which a spectral peak appears at an integer multiple of a certain frequency as shown in FIG. 2A. The harmonic structure is important information in maintaining quality and when a gap occurs in the harmonic structure, a quality degradation is perceived. FIG. 2 A shows a spectrum when the spectrum of some audio signal is analyzed. As seen in this figure, a harmonic structure with interval T is observed in the original signal. Here, a diagram showing that the spectrum of the original signal is estimated according to the conventional technique is shown in FIG. 2B. When these two figures are compared, it is observed that while the harmonic structure is maintained in the low-frequency band spectrum in the substitution source (area A1) and the high-frequency band spectrum (area A2) in the substitution destination in FIG. 2B, the harmonic structure collapses in the connection section (area A3) of the low-frequency band spectrum of the substitution source and the high-frequency band spectrum in the substitution destination. This is attributable to the fact that the conventional technique performs substitution without considering the shape of the harmonic structure. The subjective quality deteriorates due to such disturbance of the harmonic structure when an estimated spectrum is converted to a time signal and listened.

Furthermore, when FL is smaller than FH/2, that is, when it is necessary to substitute the low-frequency band spectrum twice or more in the band of $FL \leqq k < FH$, another problem occurs in adjustment of the spectral outline. The problem will be explained using FIG. 3A and FIG. 3B. The spectrum of a voice signal or audio signal is generally not flat and the energy of either the low-frequency band or the high-frequency band is larger. In this way, there is an tilt in the spectrum of a voice signal or audio signal and the energy of the high-frequency band is often smaller than the energy of the low-frequency band. When substitution of the spectrum is performed in such a situation, discontinuity of the spectral energy occurs (FIG. 3A). As shown in FIG. 3A, when a spectral outline is adjusted every predetermined period (subband), the discontinuity of the energy is not canceled (area A4 and area A5 in FIG. 3B), annoying sound occurs in the decoded signal because of this phenomenon and subjective quality deteriorates.

In view of the above described problems, the present invention proposes a technique of coding a signal of a wide frequency band at a low bit rate and with high quality.

The present invention provides a spectrum coding method of estimating the shape of the spectrum of the high-frequency band using a filter having the low-frequency band as the internal state and coding the coefficient representing the characteristic of the filter at that time to adjust a spectral outline of the estimated high-frequency band spectrum. This makes it possible to improve quality of a decoded signal.

BEST MODE FOR CARRYING OUT THE INVENTION

With reference now to the accompanying drawings, embodiments of the present invention will be explained in detail below.

Embodiment 1

Figure 4:
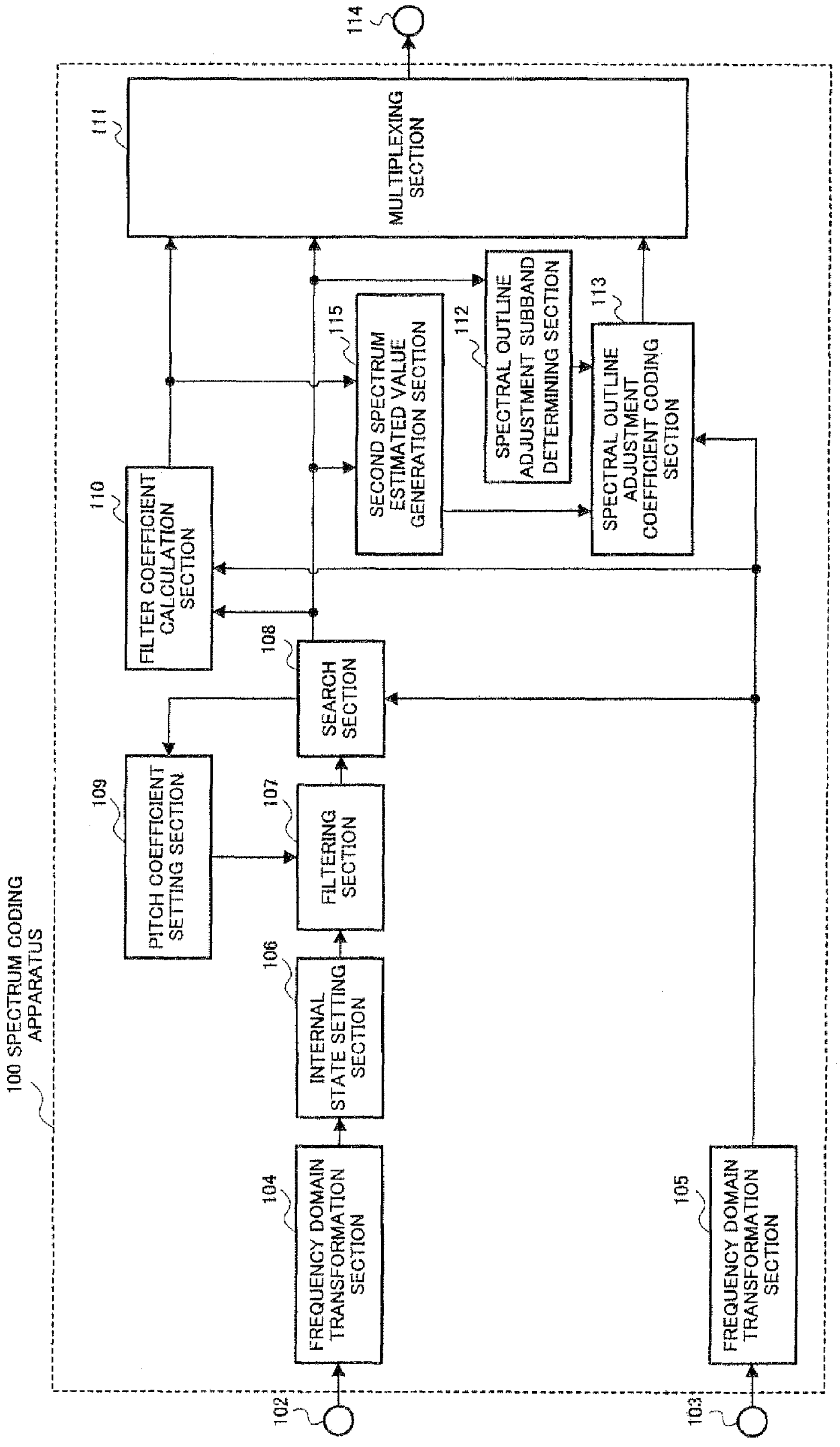
FIG. 4 illustrates a block diagram showing the configuration of a spectrum coding apparatus according to Embodiment 1.

FIG. 4 is a block diagram showing the configuration of spectrum coding apparatus 100 according to Embodiment 1 of the present invention.

A first signal whose effective frequency band is $0 \leqq k < FH$ is input from input terminal 102 and a second signal whose effective frequency band is $0 \leqq k < FH$ is input from input terminal 103. Next, frequency domain transformation section 104 performs a frequency transformation on the first signal input from input terminal 102, calculates first spectrum S1(*k*) and frequency domain transformation section 105 performs a frequency transformation on the second signal input from input terminal 103 and calculates second spectrum S2(*k*). Here, discrete Fourier transform (DFT), discrete cosine transform (DCT), modified discrete cosine transform (MDCT) or the like can be applied as the frequency transformation method.

Figure 5:
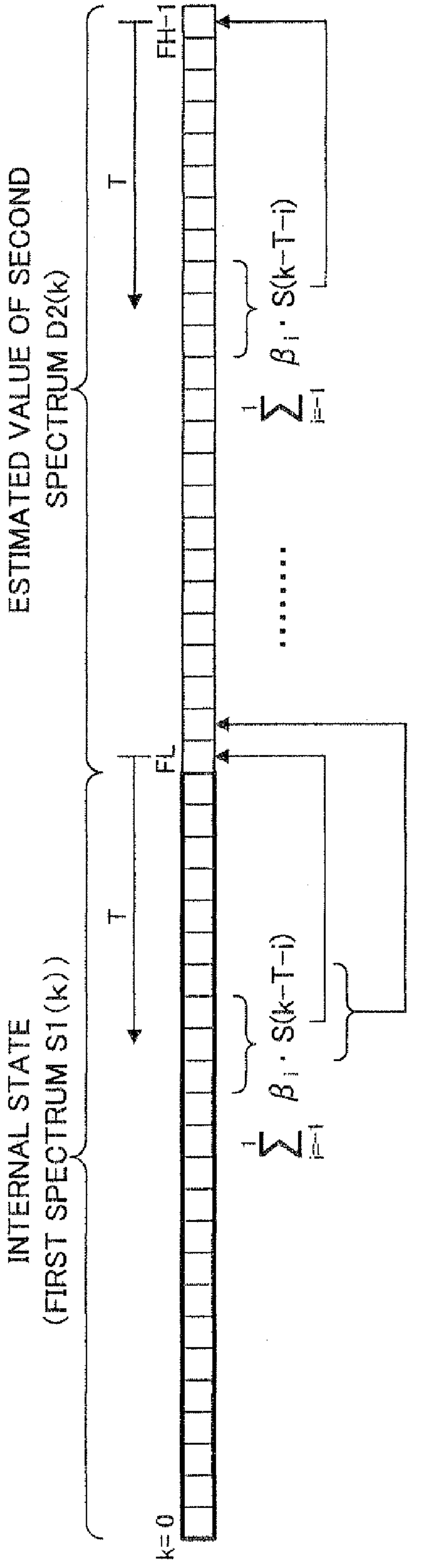
FIG. 5 illustrates a process of calculating an estimated value of a second spectrum through filtering.

Next, internal state setting section 106 sets an internal state of a filter used in filtering section 107 using first spectrum S1(*k*). Filtering section 107 performs filtering based on the internal state of the filter set by internal state setting section 106 and pitch coefficient T given from pitch coefficient setting section 109 and calculates estimated value D2(*k*) of the second spectrum. The process of calculating estimated value D2(*k*) of the second spectrum through filtering will be explained using FIG. 5. In FIG. 5, suppose the spectrum of 0≦k<FH is called "S(k)" for convenience. As shown in FIG. 5, first spectrum S1(*k*) is stored in the area of 0≦k<FL in S(k) as the internal state of the filter and estimated value D2(*k*) of the second spectrum is generated in the area of FL≦k<FH.

This embodiment will explain a case where a filter expressed by the following Expression (1) is used and T here denotes the coefficient given from coefficient setting section 109. Furthermore, suppose M=1 in this explanation.

$$P(z) = \frac{1}{1 - \sum_{i=-M}^{M} \beta_i z^{-T+i}} \tag{1}$$

In the filtering processing, an estimated value is calculated by multiplying each frequency by corresponding coefficient $\beta_i$ centered on a spectrum which is lower by frequency T in ascending order of frequency and adding up the multiplication results.

$$S(k) = \sum_{i=-1}^{1} \beta_i \cdot S(k - T - i) \tag{2}$$

Processing according to Expression (2) is performed between FL≦k<FH. S(k) (FL≦k<FH) calculated as a result is used as estimated value D2(*k*) of the second spectrum.

Search section 108 calculates a degree of similarity between second spectrum S2(*k*) given from frequency domain transformation section 105 and estimated value D2(*k*) of the second spectrum given from filtering section 107. There are various definitions of the degree of similarity and this embodiment will explain a case where filter coefficients $\beta_{-1}$ and $\beta_1$ are assumed to be 0 and the degree of similarity calculated according to the following Expression (3) defined based on a minimum square error is used. In this method, filter coefficient $\beta_i$ is determined after calculating optimum pitch coefficient T.

$$E = \sum_{k=FL}^{FH-1} S2(k)^2 - \frac{\left(\sum_{k=FL}^{FH-1} S2(k) \cdot D2(k)\right)^2}{\sum_{k=FL}^{FH-1} D2(k)^2} \tag{3}$$

Here, E denotes a square error between S2(*k*) and D2(*k*). Because the first term on the right side of Expression (3) is a fixed value regardless of pitch coefficient T, pitch coefficient T which generates D2(*k*) corresponding to a maximum of the second term on the right side of Expression (3) is searched. In this embodiment, the second term on the right side of Expression (3) will be referred to as a "degree of similarity."

Figure 6:
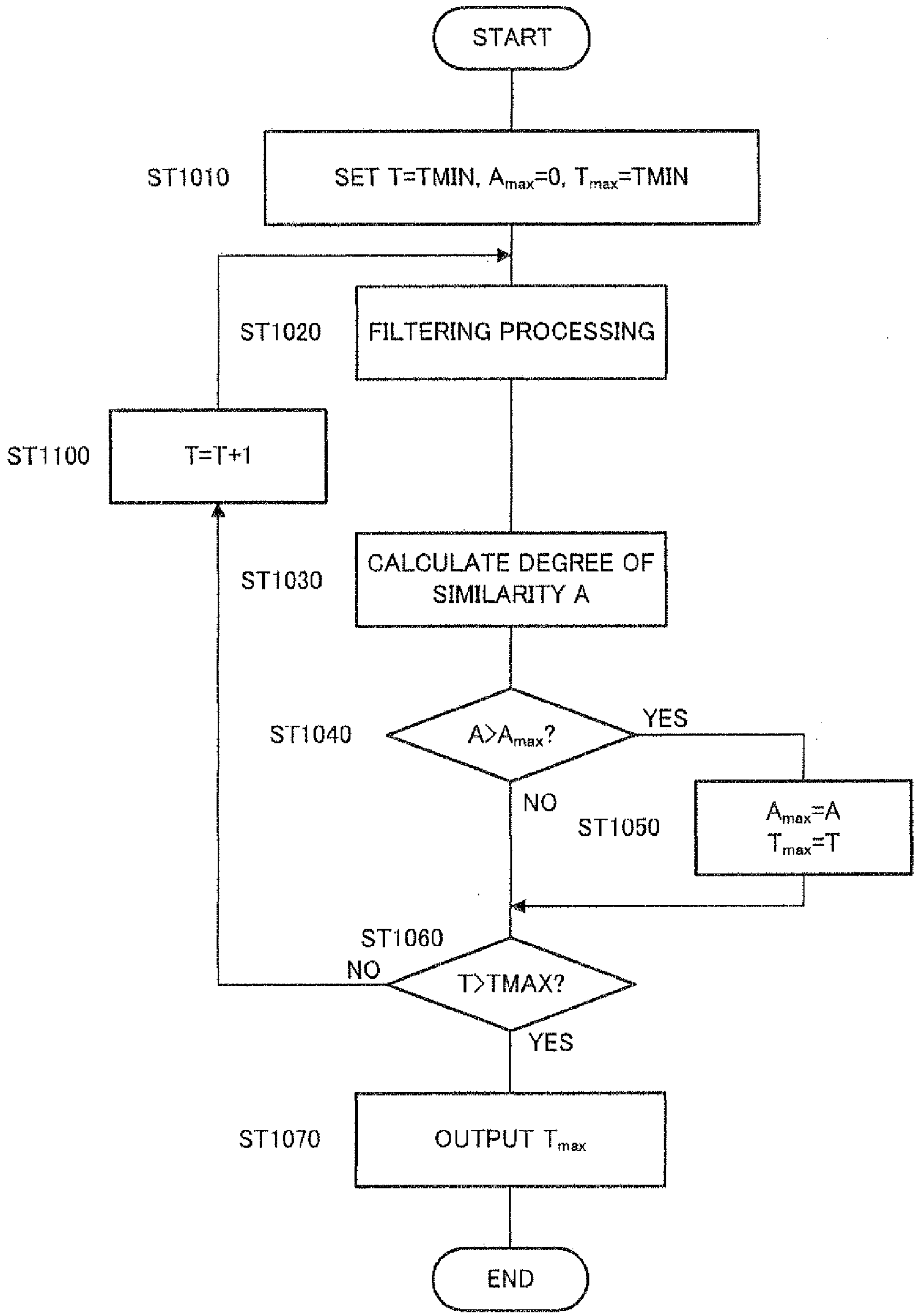
FIG. 6 illustrates a processing flow at the filtering section, search section and pitch coefficient setting section.

Pitch coefficient setting section 109 has the function of outputting pitch coefficient T included in a predetermined search range TMIN to TMAX to filtering section 107 sequentially. Therefore, every time pitch coefficient T is given from pitch coefficient setting section 109, filtering section 107 clears S(k) in the range of FL≦k<FH to zero and then performs filtering and search section 108 calculates a degree of similarity. Search section 108 determines pitch coefficient Tmax corresponding to a maximum degree of similarity calculated between TMIN and TMAX and gives pitch coefficient Tmax to filter coefficient calculation section 110, second spectrum estimated value generation section 115, spectral outline adjustment subband determining section 112 and multiplexing section 111. FIG. 6 shows the processing flow of filtering section 107, search section 108 and pitch coefficient setting section 109.

Figures 7A, 7B, 7C, 7D, 7E:
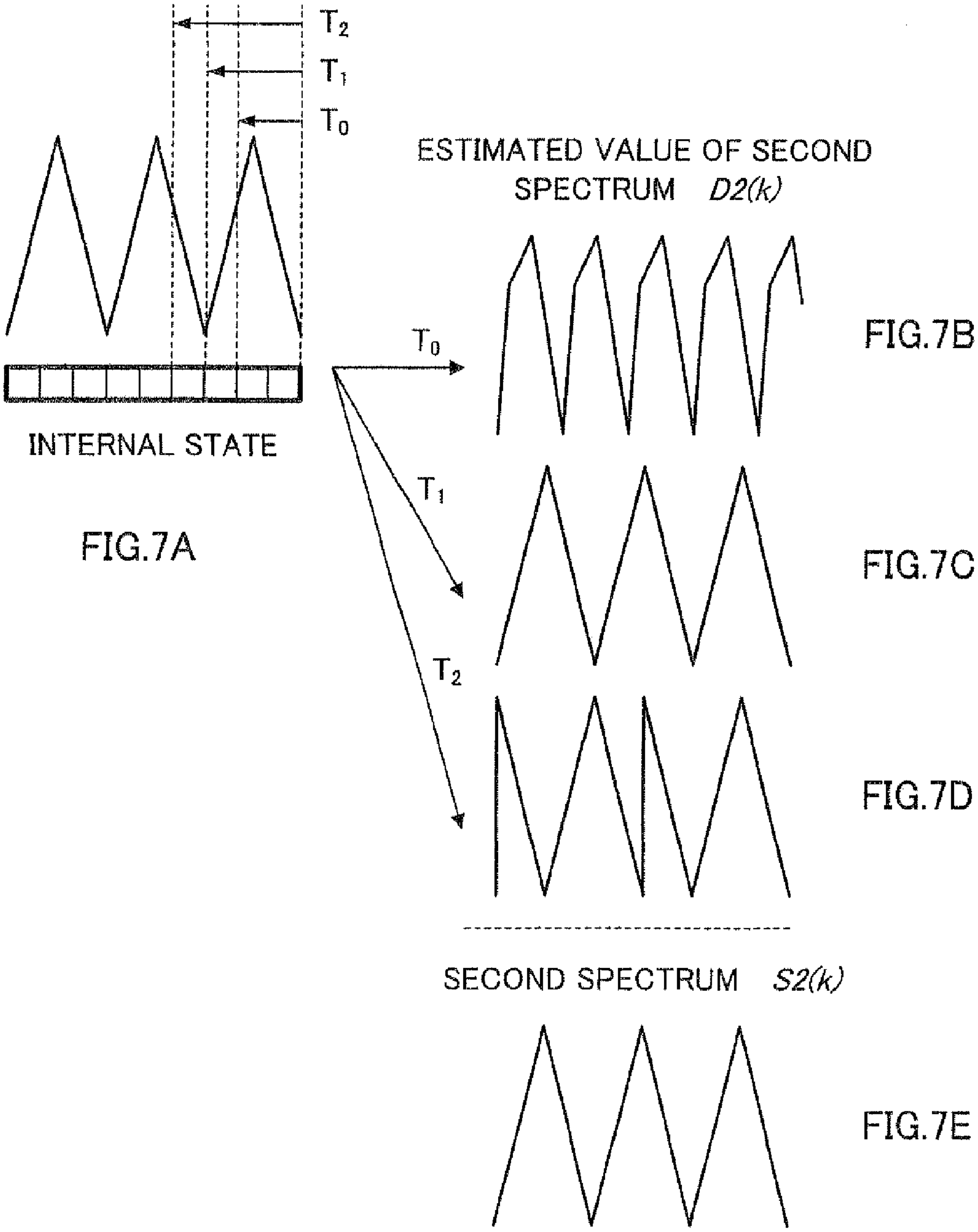
FIG. 7A shows an example of the state of filtering.
FIG. 7B shows an example of the state of filtering.
FIG. 7C shows an example of the state of filtering.
FIG. 7D shows an example of the state of filtering.
FIG. 7E shows an example of the state of filtering.

FIGS. 7A to E show an example of filtering state for ease in understanding of this embodiment. FIG. 7A shows the harmonic structure of the first spectrum stored in the internal state. FIGS. 7B to D show the relationship between the harmonic structures of the estimated values of the second spectrum calculated by performing filtering using three types of pitch coefficients $T_0$, $T_1$, $T_2$. According to this example, $T_1$ whose shape is similar to second spectrum S2(*k*) is selected as pitch coefficient T whereby the harmonic structure is maintained (see FIG. 7C and FIG. 7E).

Furthermore, FIGS. 8A to E show another example of the harmonic structure of the first spectrum stored in the internal state. In this example also, an estimated spectrum whereby the harmonic structure is maintained is calculated when pitch coefficient $T_1$ is used and it is $T_1$ that is output from search section 108 (see FIG. 8C and FIG. 8E).

Next, filter coefficient calculation section 110 determines filter coefficient $\beta_i$ using pitch coefficient Tmax given from search section 108. Filter coefficient $\beta_i$ is determined so as to minimize square distortion E which follows the following Expression (4).

$$E = \sum_{k=FL}^{FH-1} \left( S2(k) - \sum_{i=-1}^{1} \beta_i S(k - T_{max} - i) \right)^2 \tag{4}$$

Filter coefficient calculation section 110 stores a plurality of combinations of $\beta_i$ (i=−1,0,1) as a table beforehand, determines a combination of $\beta_i$ (i=−1,0,1) which minimizes square error E of Expression (4) and gives the code to second spectrum estimated value generation section 115 and multiplexing section 111.

Second spectrum estimated value generation section 115 generates estimated value D2(*k*) of the second spectrum according to Expression (1) using pitch coefficient Tmax and filter coefficient $\beta_i$ and gives it to spectral outline adjustment coefficient coding section 113.

Pitch coefficient Tmax is also given to spectral outline adjustment subband determining section 112. Spectral outline adjustment subband determining section 112 determines a subband for spectral outline adjustment based on pitch coefficient Tmax. A jth subband can be expressed by the following Expression (5) using pitch coefficient Tmax.

$$\begin{cases} BL(j) = FL + (j-1) \cdot T_{max} \\ BH(j) = FL + j \cdot T_{max} \end{cases} \quad (0 \le j < J) \tag{5}$$

Here, BL(j) denotes a minimum frequency of the jth subband and BH(j) denotes a maximum frequency of the jth subband. Furthermore, the number of subbands J is expressed as a minimum integer corresponding to maximum frequency BH(J−1) of the (j−1)th subband that exceeds FH. The information about the spectral outline adjustment subband determined in this way is given to spectral outline adjustment coefficient coding section 113.

Spectral outline adjustment coefficient coding section 113 calculates a spectral outline adjustment coefficient and performs coding using the spectral outline adjustment subband information given from spectral outline adjustment subband determining section 112, estimated value D2($k$) of the second spectrum given from second spectrum estimated value generation section 115 and second spectrum S2($k$) given from frequency domain transformation section 105. This embodiment will explain a case where the relevant spectrum outline information is expressed with spectral power for each subband. At this time, the spectral power of the jth subband is expressed by the following Expression (6).

$$B(j)=\sum_{k=BL(j)}^{BH(j)} S2(k)^2 \tag{6}$$

Here, BL(j) denotes a m frequency of the jth subband and BH(j) denotes a maximum frequency of the jth subband. The subband information of the second spectrum determined in this way is regarded as the spectral outline information of the second spectrum. Likewise, subband information b(j) of estimated value D2($k$) of the second spectrum is calculated according to the following Expression (7), $$b(j)=\sum_{k=BL(j)}^{BH(j)} D2(k)^2 \tag{7}$$

and amount of variation V(j) is calculated for each subband according to the following Expression (8).

$$V(j)=\sqrt{\frac{B(j)}{b(j)}} \tag{8}$$

Next, amount of variation V(j) is coded and the code is sent to multiplexing section 111.

To calculate more detailed spectral outline information, the following method may also be applied. A spectral outline adjustment subband is further divided into subbands of a smaller bandwidth and a spectral outline adjustment coefficient is calculated for each subband. For example, when the jth subband is divided by division number N, $$V(j,n)=\sqrt{\frac{B(j,n)}{b(j,n)}} \quad (0\le j<J,\ 0\le n<N) \tag{9}$$

a vector of the Nth order spectrum adjustment coefficient is calculated for each subband using Expression (9), this vector is vector-quantized and an index of a representative vector corresponding to minimum distortion is output to multiplexing section 111. Here, B(j,n) and b(j,n) are calculated as follows:

$$B(j,n)=\sum_{k=BL(j,n)}^{BH(j,n)} S2(k)^2 \quad (0\le j<J,\ 0\le n<N) \tag{10}$$

-continued $$b(j,n)=\sum_{k=BL(j,n)}^{BH(j,n)} D2(k)^2 \quad (0\le j<J,\ 0\le n<N) \tag{11}$$

Furthermore, BL(j,n), BH(j,n) denote a minimum frequency and a maximum frequency of the nth division section of the jth subband respectively.

Multiplexing section 111 multiplexes information about optimum pitch coefficient Tmax obtained from search section 108, information about the filter coefficient obtained from filter coefficient calculation section 110 and information about the spectral outline adjustment coefficient obtained from spectral outline adjustment coefficient coding section 113 and outputs the multiplexing result from output terminal 114.

This embodiment has explained when M=1 in Expression (1), but M is not limited to this value and any integer equal to or more than 0 can be used. Furthermore, this embodiment has explained the case where frequency domain transformation sections 104,105 are used, but these are the components which are necessary when a time domain signal is input and the frequency domain transformation section is not necessary in a configuration in which a spectrum is input directly.

Embodiment 2

Figure 9:
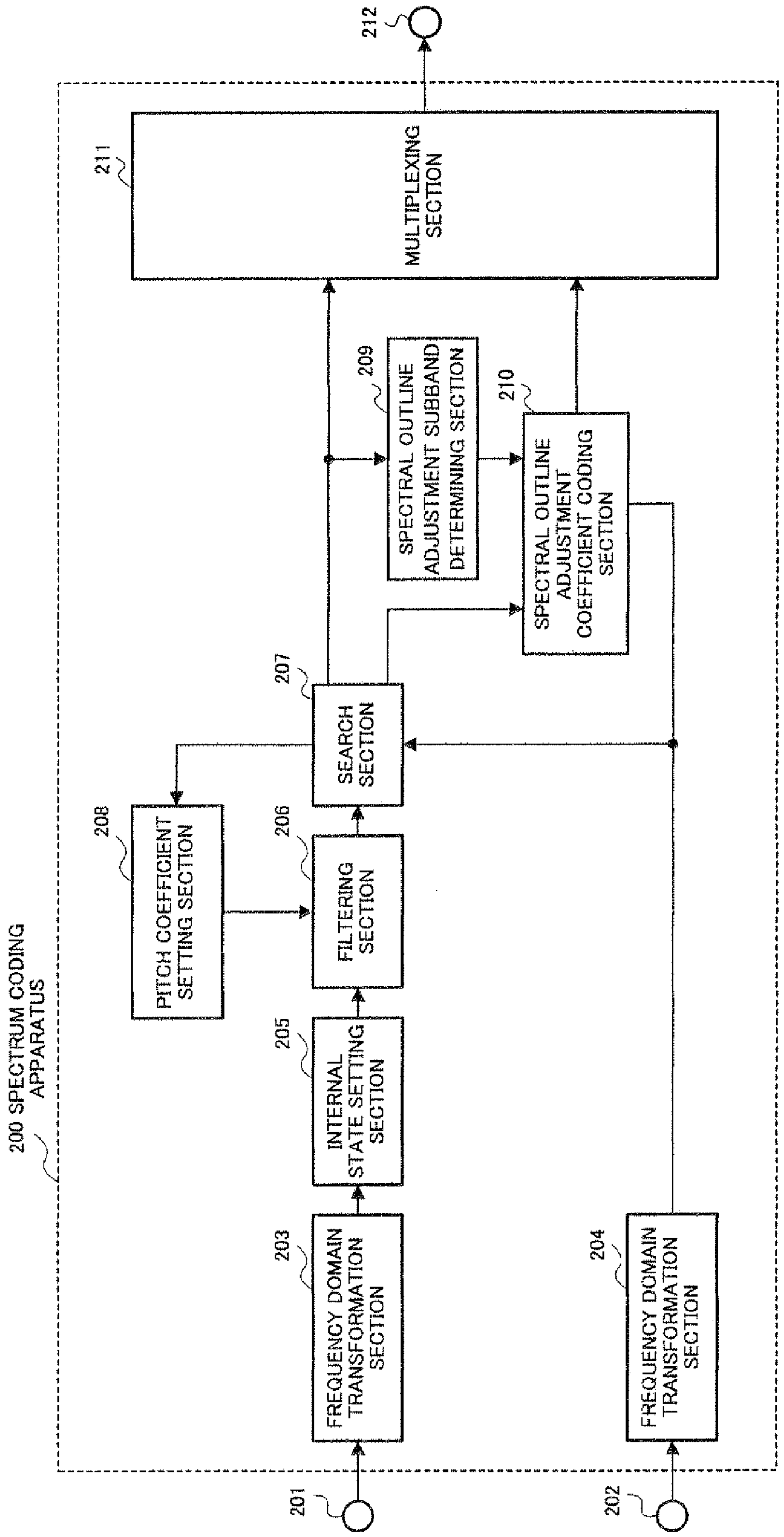
FIG. 9 is a block diagram showing the configuration of a spectrum coding apparatus according to Embodiment 2.

FIG. 9 is a block diagram showing the configuration of spectrum coding apparatus 200 according to Embodiment 2 of the present invention. Since this embodiment adopts a simple configuration for a filter used at a filtering section, it requires no filter coefficient calculation section and produces the effect that a second spectrum can be estimated with a small amount of calculation. In FIG. 9, components having the same names as those in FIG. 4 have identical functions, and therefore detailed explanations of such components will be omitted. For example, spectral outline adjustment subband determining section 112 in FIG. 4 has a name "spectral outline adjustment subband determining section" identical to the spectral outline adjustment subband determining section 209 in FIG. 9, and therefore it has an identical function.

The configuration of the filter used at filtering section 206 is a simplified one as shown in the following expression.

$$P(z)=\frac{1}{1-z^{-T}} \tag{12}$$

Figure 10:
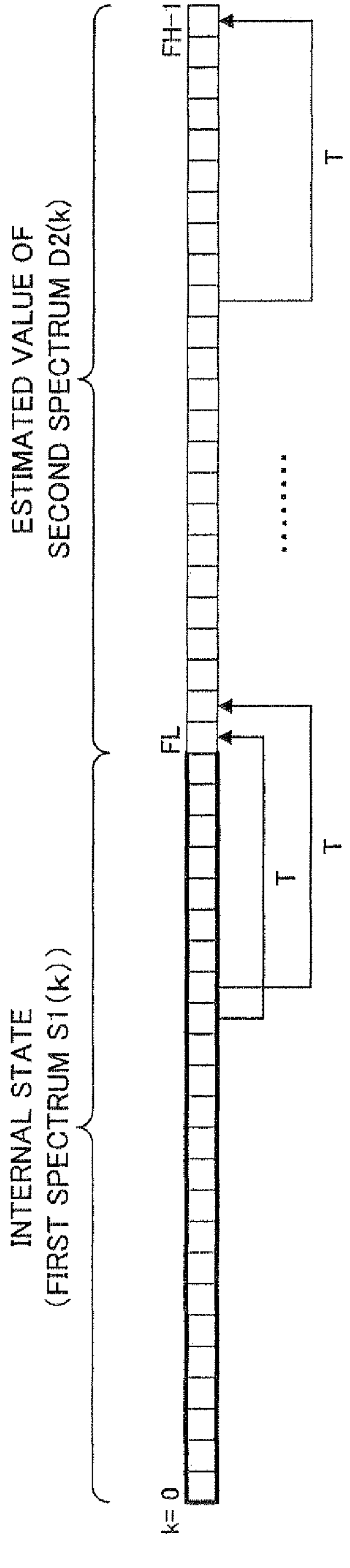
FIG. 10 illustrates a state of filtering according to Embodiment 2.

Expression (12) corresponds to a filter expressed assuming M=0, $\beta_0$=1 based on Expression (1). The state of filtering in this case is shown in FIG. 10. In this way, estimated value D2($k$) of the second spectrum can be obtained by sequentially copying spectra in the low-frequency band located apart by T.

Furthermore, search section 207 determines optimum pitch coefficient Tmax by searching pitch coefficient T which corresponds to a minimum value in Expression (3) as in the case of Embodiment 1. Pitch coefficient Tmax obtained in this way is given to multiplexing section 211.

This configuration assumes that a value temporarily generated by search section 207 for the search is used as estimated value D2($k$) of the second spectrum given to spectral outline adjustment coefficient coding section 210. Therefore, second spectrum estimated value D2(*k*) is given to spectral outline adjustment coefficient coding section 210 from search section 207.

Embodiment 3

Figure 11:
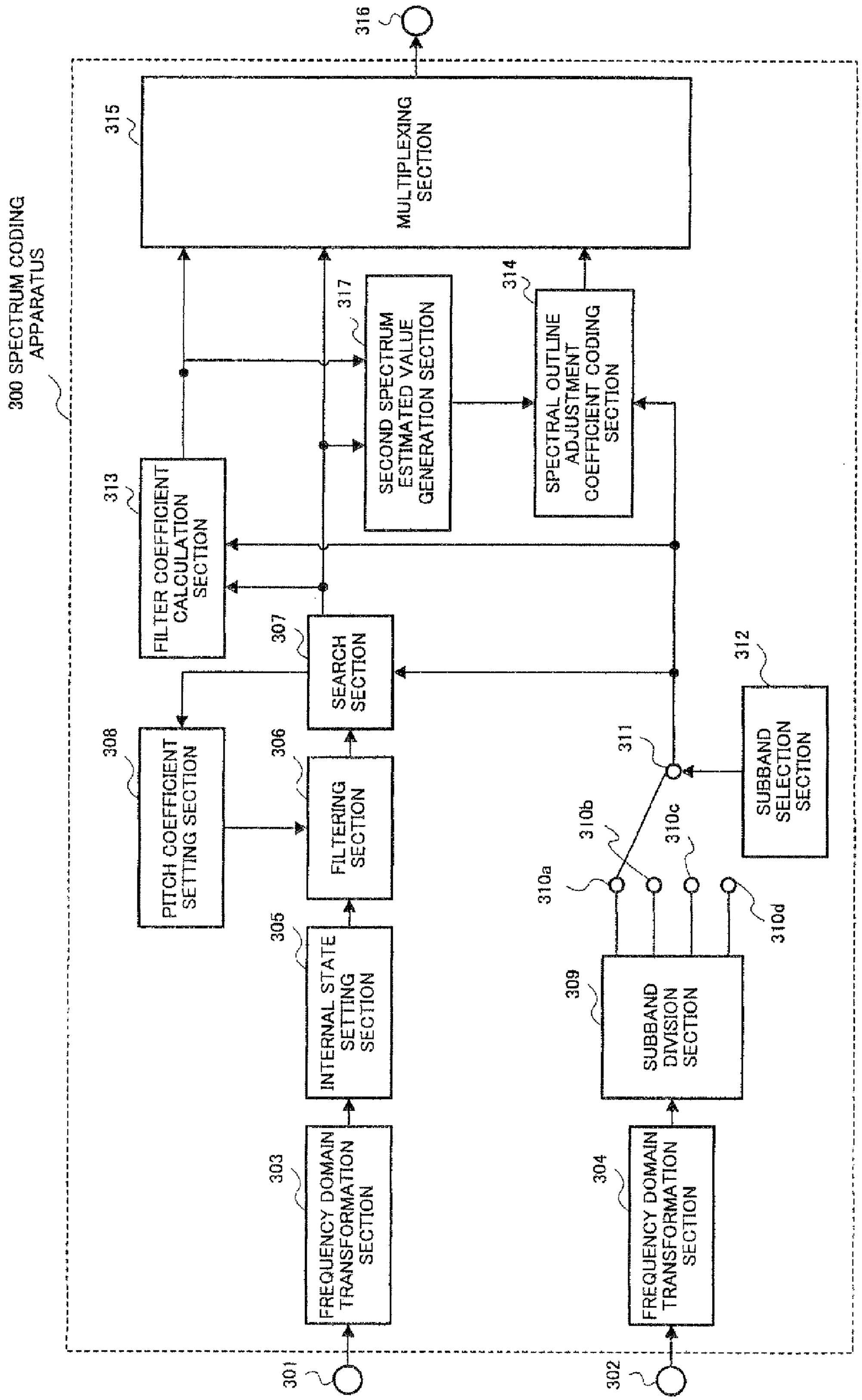
FIG. 11 is a block diagram showing the configuration of a spectrum coding apparatus according to Embodiment 3.

FIG. 11 is a block diagram showing the configuration of spectrum coding apparatus 300 according to Embodiment 3 of the present invention. The features of this embodiment include dividing a band FL≦k<FH is into a plurality of subbands beforehand, performing a search for pitch coefficient T, calculation of a filter coefficient and adjustment of a spectral outline for each subband and coding these pieces of information.

This avoids the problem with discontinuity of spectral energy caused by a spectral tilt included in the spectrum in a band of 0≦k<FL which is the substitution source. In addition, coding is performed independently for each subband, and therefore it is possible to produce the effect of realizing an extension of a band of higher quality. Because the components in FIG. 11 having the same names as those in FIG. 4 have identical functions, detailed explanations of such components will be omitted.

Subband division section 309 divides band FL≦k<FH of second spectrum S2(*k*) given from frequency domain transformation section 304 into predetermined J subbands. This embodiment will be explained assuming J=4. Subband division section 309 outputs spectrum S2(*k*) included in a 0th subband to terminal 310*a*. In the same way, spectra S2(*k*) included in a first subband, second subband and third subband are output to terminals 310*b*, 310*c* and 310*d* respectively.

Subband selection section 312 controls switching section 311 in such a way that the switching section 311 selects terminal 310*a*, terminal 310*b*, terminal 310*c* and terminal 310*d* sequentially. In other words, subband selection section 312 sequentially selects the 0th subband, first subband, second subband and third subband and gives spectrum S2(*k*) to search section 307, filter coefficient calculation section 313 and spectral outline adjustment coefficient coding section 314. Hereinafter, processing is performed in subband units, pitch coefficient Tmax, filter coefficient $\beta_i$ and spectral outline adjustment coefficient are calculated for each subband and given to multiplexing section 315. Therefore, information about J pitch coefficients Tmax, information about J filter coefficients and information about J spectral outline adjustment coefficients are given to multiplexing section 315.

Furthermore, since subbands are predetermined in this embodiment, the spectral outline adjustment subband determining section is not necessary.

Figure 12:
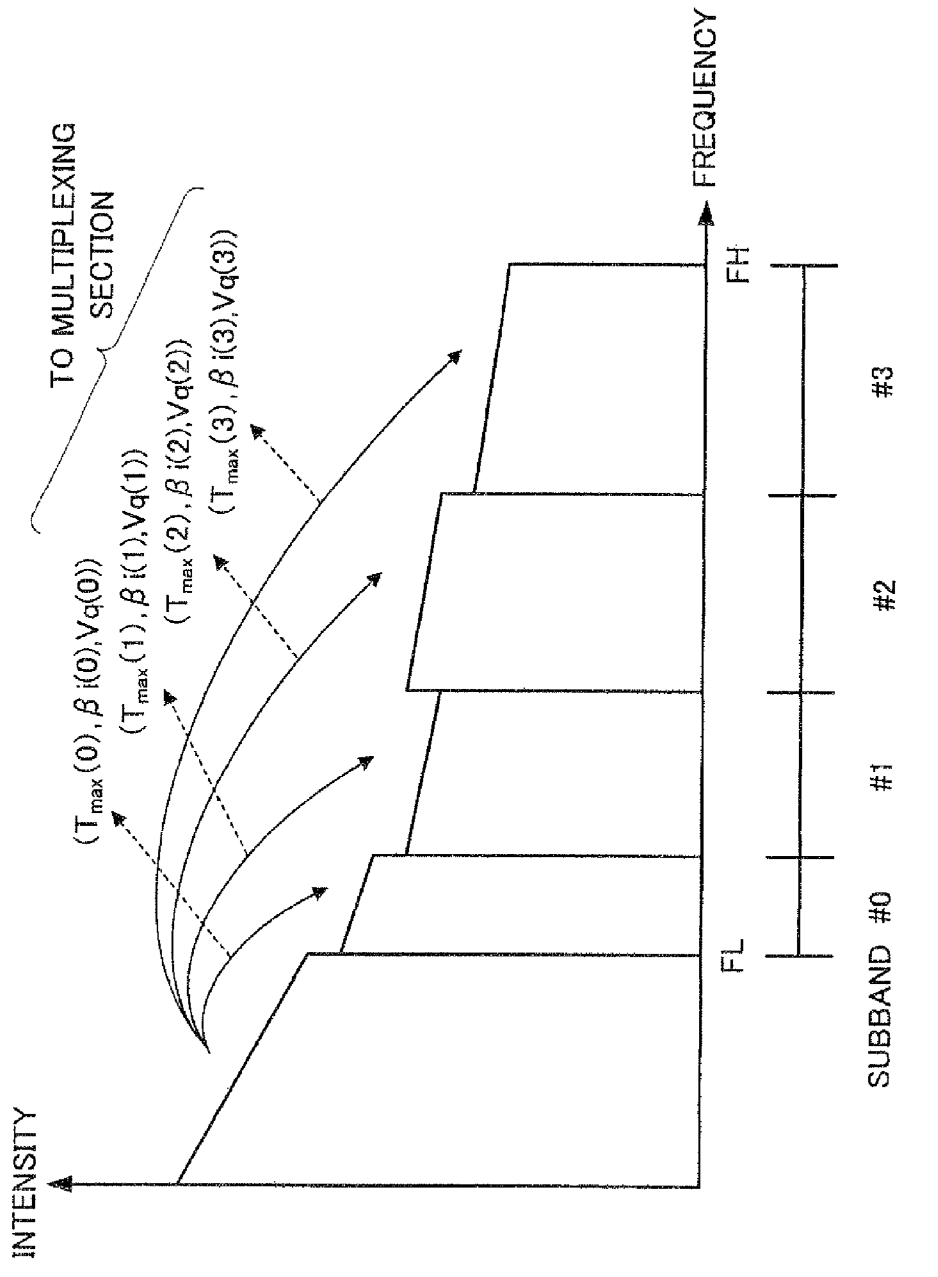
FIG. 12 illustrates a state of processing of Embodiment 3.

FIG. 12 illustrates the state of processing according to this embodiment. As shown in this figure, band FL≦k<FH is divided into predetermined subbands, Tmax, βi, Vq are calculated for each subband and sent to the multiplexing section respectively. This configuration matches the bandwidth of a spectrum substituted from a low-frequency band spectrum with the bandwidth of the subband for spectral outline adjustment, which results in preventing discontinuity of spectral energy and improving sound quality.

Embodiment 4

Figure 13:
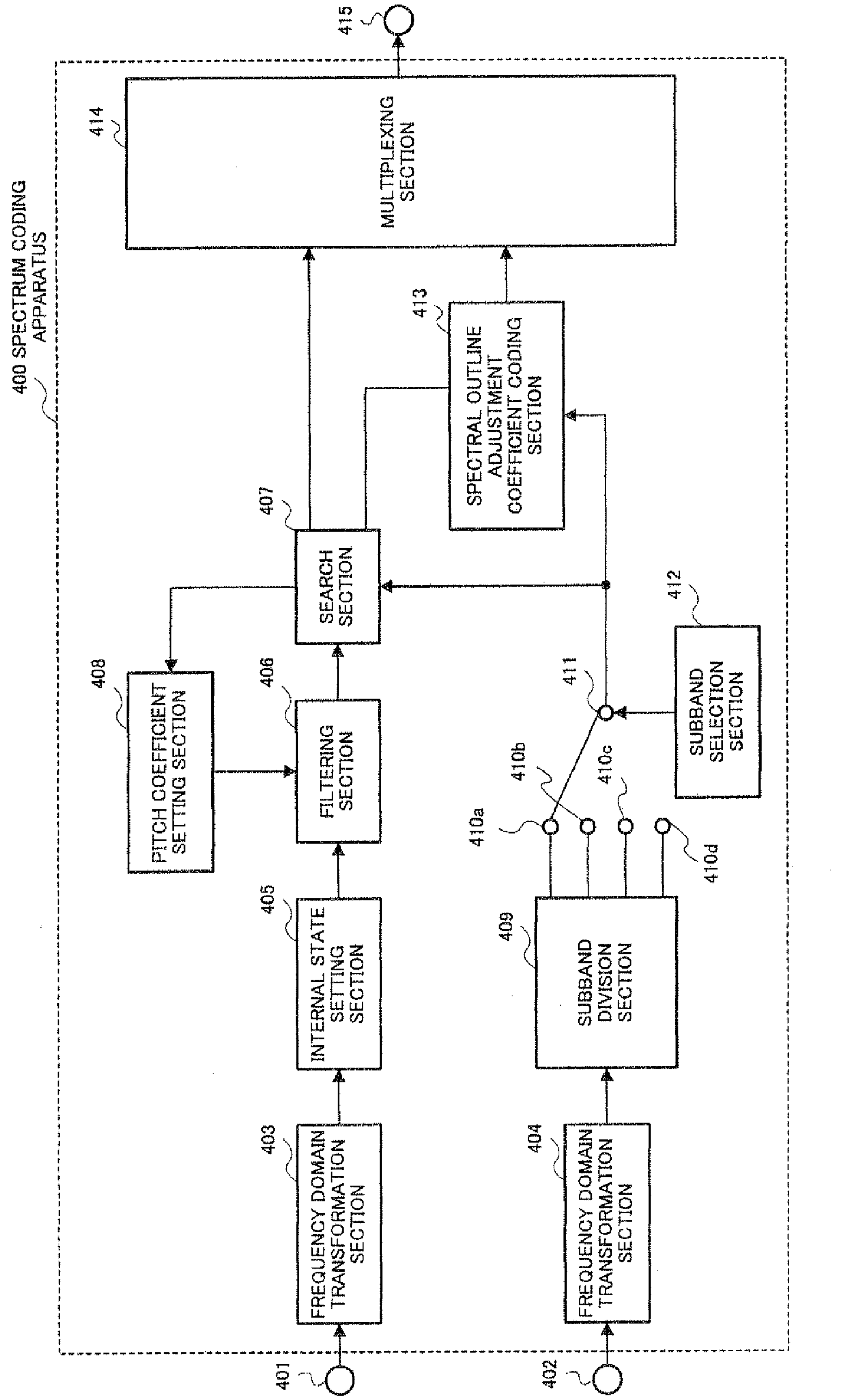
FIG. 13 is a block diagram showing the configuration of a spectrum coding apparatus according to Embodiment 4.

FIG. 13 is a block diagram showing the configuration of spectrum coding apparatus 400 according to Embodiment 4 of the present invention. A feature of this embodiment includes simplifying the configuration of filter used at a filtering section based on above described Embodiment 3. This eliminates the necessity for a filter coefficient calculation section and has the effect that a second spectrum can be estimated with a smaller amount of calculation. In FIG. 13, components having the same names as those in FIG. 11 have identical functions, and therefore detailed explanations of such components will be omitted.

The configuration of the filter used at filtering section 406 is simplified as shown in the following expression.

$$P(z) = \frac{1}{1 - z^{-T}} \tag{13}$$

Expression (13) corresponds to a filter which is expressed based on Expression (1) assuming M=0, $\beta_0$=1. The state of filtering at this time is shown in FIG. 10. In this way, estimated value D2(*k*) of the second spectrum can be determined by sequentially copying spectra in the low-frequency band located apart by T. Furthermore, search section 407 searches for pitch coefficient T which corresponds to a minimum value in Expression (3) and determines it as optimum pitch coefficient Tmax as in the case of Embodiment 1. Pitch coefficient Tmax obtained in this way is given to multiplexing section 414.

This configuration assumes that a value temporarily generated for a search by search section 407 is used as estimated value D2(*k*) of the second spectrum given to spectral outline adjustment coefficient coding section 413. Therefore, second spectrum estimated value D2(*k*) is given to spectral outline adjustment coefficient coding section 413 from search section 407.

Embodiment 5

Figure 14:
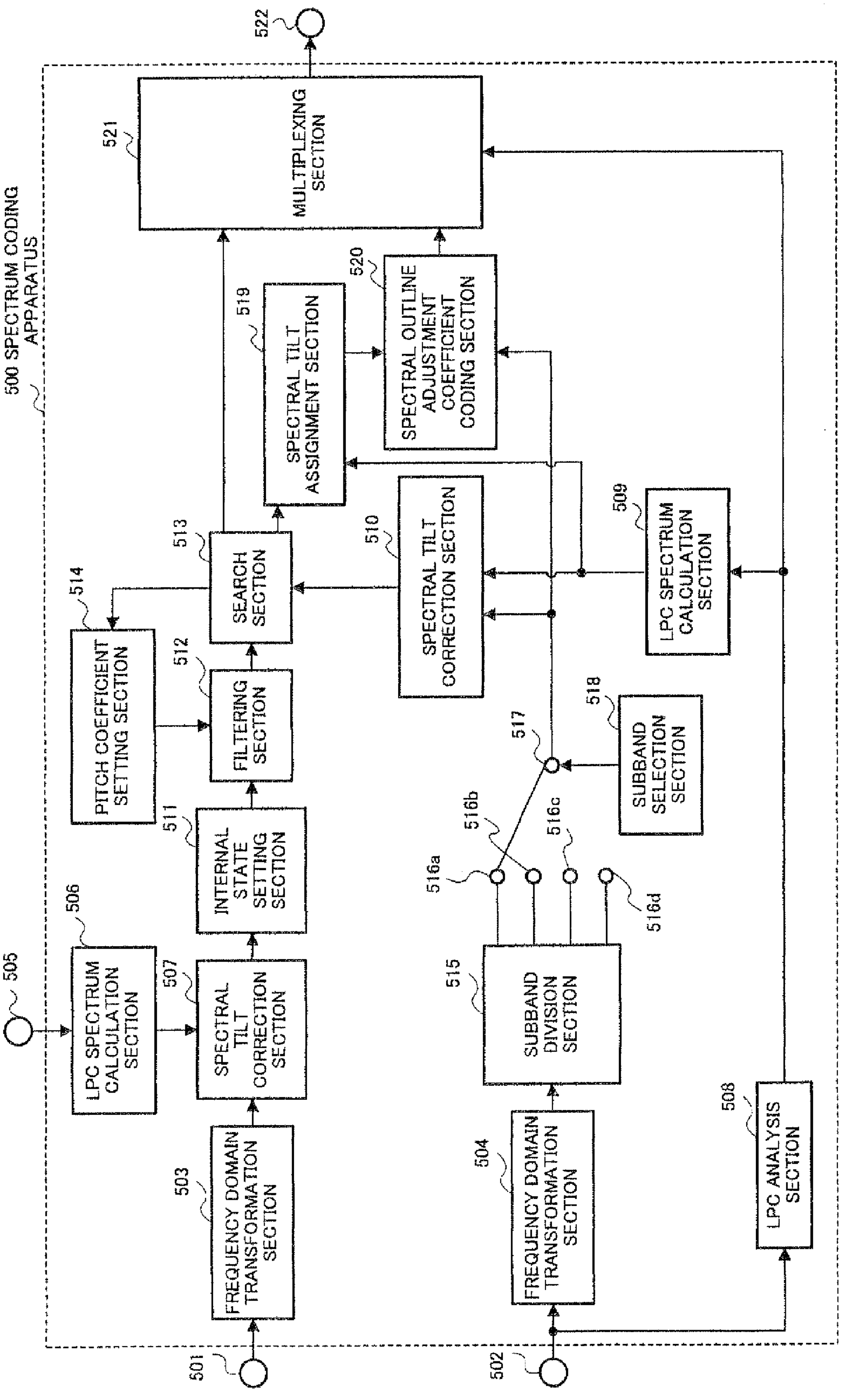
FIG. 14 is a block diagram showing the configuration of a spectrum coding apparatus according to Embodiment 5.

FIG. 14 is a block diagram showing the configuration of spectrum coding apparatus 500 according to Embodiment 5 of the present invention. Features of this embodiment include correcting spectral tilts of first spectrum S1(*k*) and second spectrum S2(*k*) using an LPC spectrum respectively, and determining estimated value D2(*k*) of the second spectrum using the corrected spectra. This produces the effect of solving the problem of discontinuity of spectral energy. In FIG. 14, components having the same names as those in FIG. 13 have identical functions, and therefore detailed explanations of such components will be omitted. Moreover, this embodiment will explain a case where a technique of correcting spectral tilts is applied to above described Embodiment 4, but this technique is not limited to this and is also applicable to each of above described Embodiments 1 to 3.

Here, LPC coefficients calculated by an LPC analysis section (not shown here) or LPC decoding section is input from input terminal 505 and given to LPC spectrum calculation section 506. Apart from this, the configuration may also be adapted such that the LPC coefficients is determined by performing an LPC analysis on the signal input from input terminal 501. In this case, input terminal 505 is not necessary and the LPC analysis section is newly added instead.

LPC spectrum calculation section 506 calculates a spectrum envelope according to Expression (14) shown below based on the LPC coefficients.

$$e1(k) = \left| \frac{1}{1 - \sum_{i=1}^{NP} \alpha(i) \cdot e^{-j\frac{2\pi ki}{K}}} \right| \quad (14)$$

Or the spectrum envelope may also be calculated according to the following Expression (15).

$$e1(k) = \left| \frac{1}{1 - \sum_{i=1}^{NP} \alpha(i) \cdot \gamma^i \cdot e^{-j\frac{2\pi ki}{K}}} \right| \quad (15)$$

Here, α denotes LPC coefficients, NP denotes the order of the LPC coefficients and K denotes a spectral resolution.

Furthermore, γ is a constant equal to or greater than 0 and less than 1 and the use of this γ can smooth the shape of the spectrum.

Spectrum envelope e1(*k*) obtained in this way is given to spectral tilt correction section 507.

Spectral tilt correction section 507 corrects spectral tilt which is present in first spectrum S1(*k*) given from frequency domain transformation section 503 using spectrum envelope e1(*k*) obtained from LPC spectrum calculation section 506 according to the following Expression (16).

$$S1new(k) = \frac{S1(k)}{e1(k)} \quad (16)$$

The corrected first spectrum obtained in this way is given to internal state setting section 511.

On the other hand, similar processing will also be performed when calculating the second spectrum. A second signal input from input terminal 502 is given to LPC analysis section 508 and performed an LPC analysis to obtain LPC coefficients. The LPC coefficients obtained here are converted to parameters which are suitable for coding such as LSP coefficients, then coded and an index thereof is given to multiplexing section 521. Simultaneously, the LPC coefficients are decoded and the decoded LPC coefficients are given to LPC spectrum calculation section 509. LPC spectrum calculation section 509 has a function similar to that of above described LPC spectrum calculation section 506 and calculates spectrum envelope e2(*k*) for the second signal according to Expression (14) or Expression (15). Spectral tilt correction section 510 has a function similar to that of above described spectral tilt correction section 507 and corrects the spectral tilt which is present in the second spectrum according to the following Expression (17).

$$S2new(k) = \frac{S2(k)}{e2(k)} \quad (17)$$

The corrected second spectrum obtained in this way is given to search section 513 and at the same time given to spectral tilt assignment section 519.

Spectral tilt assignment section 519 assigns a spectral tilt to estimated value D2(*k*) of the second spectrum given from search section 513 according to the following Expression (18).

$$D2\text{new}(k) = D2(k) \cdot e2(k) \quad (18)$$

Estimated value s2new(k) of the second spectrum calculated in this way is given to spectral outline adjustment coefficient coding section 520.

Multiplexing section 521 multiplexes information about pitch coefficient Tmax given from search section 513, information about an adjustment coefficient given from spectral outline adjustment coefficient coding section 520 and coding information about the LPC coefficients given from the LPC analysis section, and outputs the multiplexing result from output terminal 522.

Embodiment 6

Figure 15:
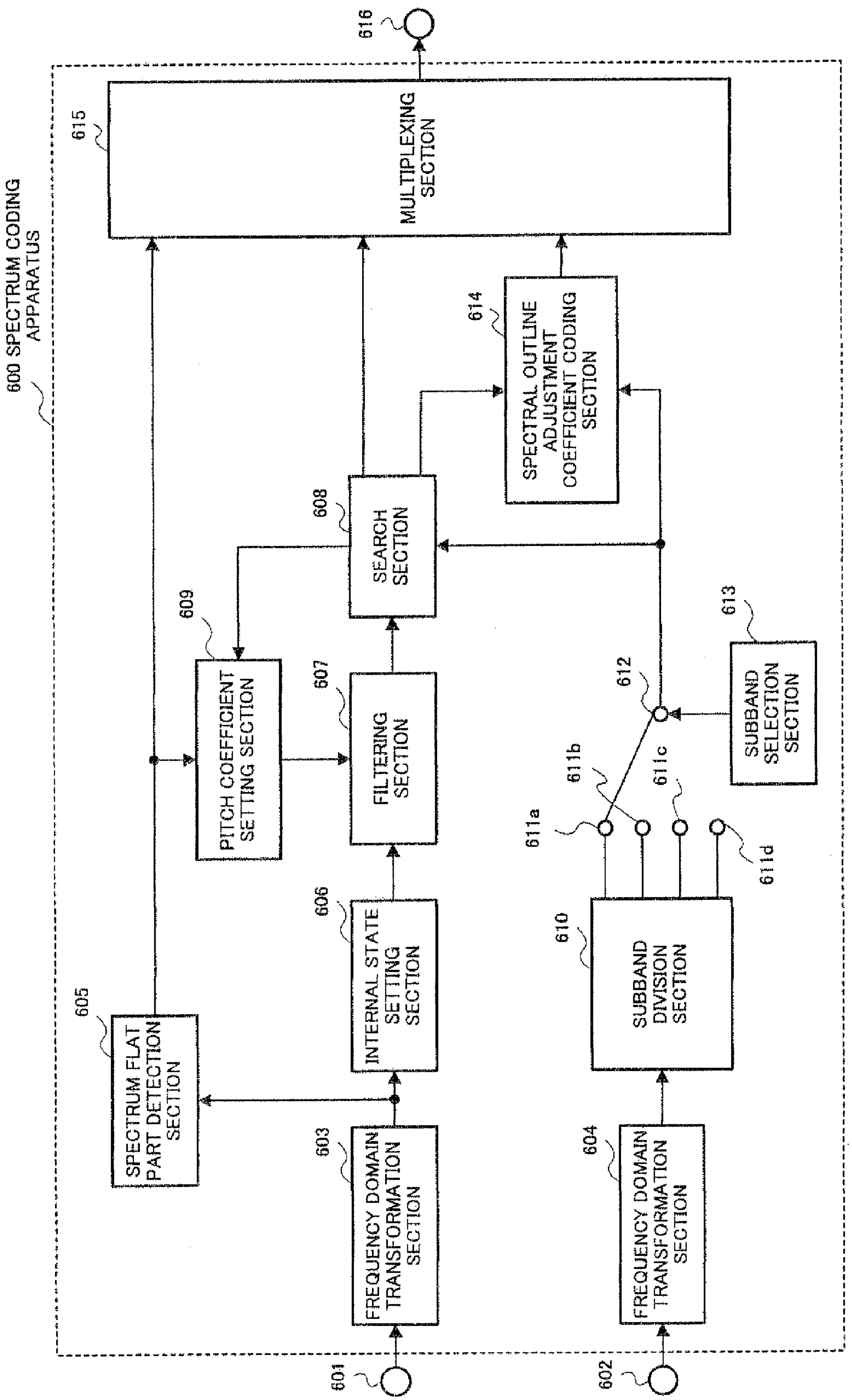
FIG. 15 is a block diagram showing the configuration of a spectrum coding apparatus according to Embodiment 6.

FIG. 15 is a block diagram showing the configuration of spectrum coding apparatus 600 according to Embodiment 6 of the present invention. Features of this embodiment include detecting a band in which the shape of a spectrum is relatively flat from within first spectrum S1(*k*) and searching pitch coefficient T from this flat band. This makes it less likely that the energy of the spectrum after substitution may become discontinuous and produces the effect of avoiding the problem of discontinuity of spectral energy. In FIG. 15, components having the same names as those in FIG. 13 have identical functions, and therefore detailed explanations of such components will be omitted. Furthermore, this embodiment will explain a case where a technique of correcting spectral tilts is applied to aforementioned Embodiment 4, but this technique is not limited to this and is also applicable to each of the aforementioned embodiments.

First spectrum S1(*k*) is given to spectral flat part detection section 605 from frequency domain transformation section 603 and a band in which the spectrum has the flat shape is detected from first spectrum S1(*k*). Spectral flat part detection section 605 divides first spectrum S1(*k*) in band 0≦k<FL into a plurality of subbands, quantifies the amount of spectral variation of each subband and detects a subband with the smallest amount of spectral variation. The information indicating the subband is given to pitch coefficient setting section 609 and multiplexing section 615.

This embodiment will explain a case where a variance of a spectrum included in a subband is used as means for quantifying the amount of spectral variation. Band 0≦k<FL is divided into N subbands and variance u(n) of spectrum S1(*k*) included in each subband is calculated according to the following Expression (19).

$$u(n) = \frac{\sum_{k=BL(n)}^{BH(n)} (|S1(k)| - S1_{mean})^2}{BH(n) + BL(n) + 1} \quad (19)$$

Here, BL(n) denotes a minimum frequency of an nth subband, BH(n) denotes a maximum frequency of the nth subband, S1 mean denotes an average of the absolute value of the spectrum included in the nth subband. Here, the absolute value of the spectrum is taken because it is intended to detect a flat band from the standpoint of the amplitude value of the spectrum.

Variances u(n) of the respective subbands obtained in this way are compared, a subband with the smallest variance is determined and variable n indicating the subband is given to pitch coefficient setting section 609 and multiplexing section 615.

Pitch coefficient setting section 609 limits the search range of pitch coefficient T into the band of the subband determined by spectral flat part detection section 605 and determines a candidate of pitch coefficient T within the limited range. Because pitch coefficient T is determined from within the band where the variation of spectral energy is small in this way, the problem of discontinuity of spectral energy is reduced. Multiplexing section 615 multiplexes information about pitch coefficient Tmax given from search section 608, information about an adjustment coefficient given from spectral outline adjustment coefficient coding section 614 and information about a subband given from spectral flat part detection section 605, and outputs the multiplexing result from output terminal 616.

Embodiment 7

Figure 16:
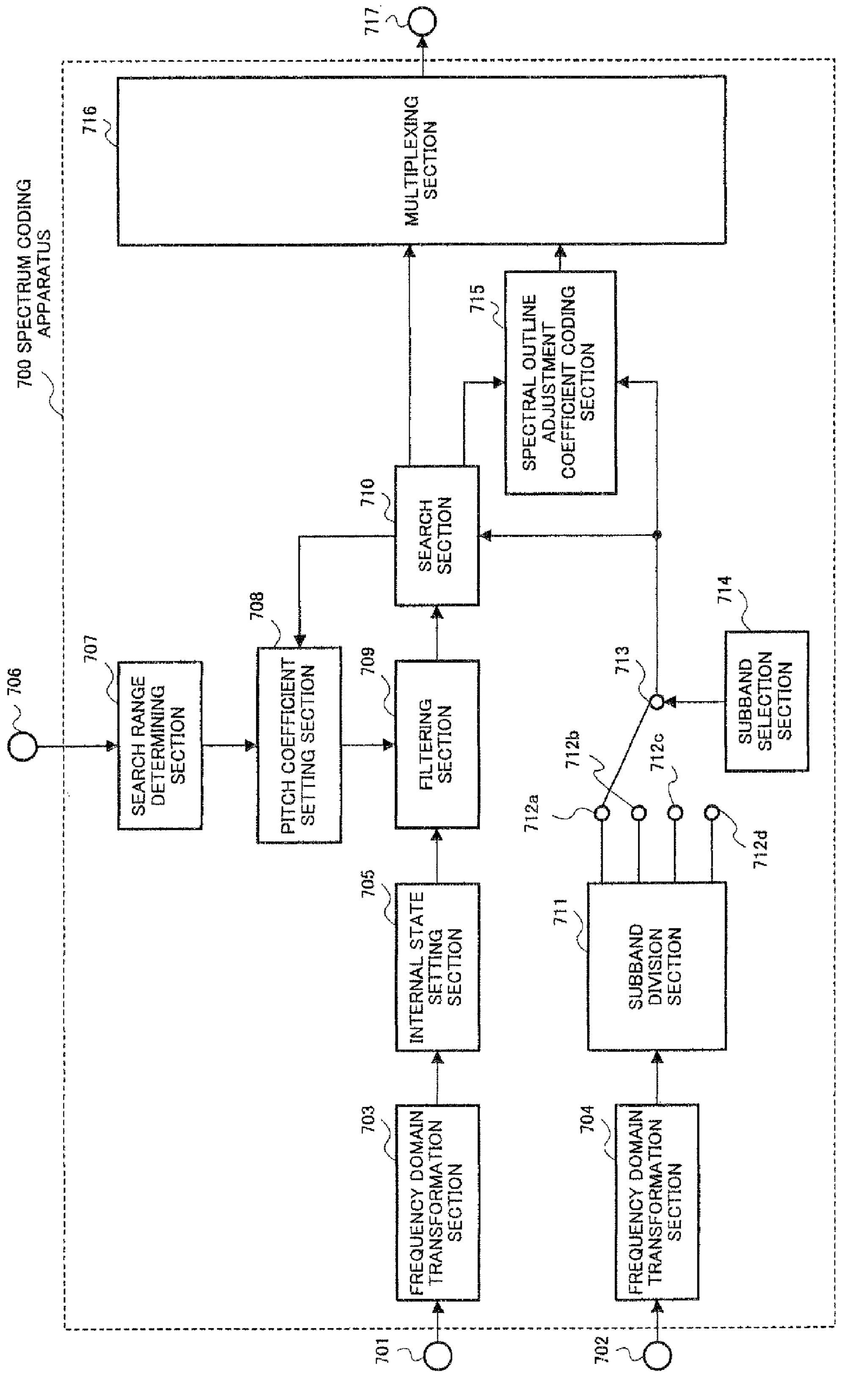
FIG. 16 is a block diagram showing the configuration of a spectrum coding apparatus according to Embodiment 7.

FIG. 16 is a block diagram showing the configuration of spectrum coding apparatus 700 according to Embodiment 7 of the present invention. A feature of this embodiment includes adaptively changing the range for searching pitch coefficient T according to the degree of periodicity of an input signal. In this way, since no harmonic structure exists for a less periodic signal such as a silence part, problems are less likely to occur even when the search range is set to be very small. Furthermore, for a more periodic signal such as a voiced sound part, the range for searching pitch coefficient T is changed according to the value of the pitch period at that time. This makes it possible to reduce the amount of information for expressing pitch coefficient T and reduce the bit rate. In FIG. 16 components having the same names as those in FIG. 13 have identical functions and therefore detailed explanations of such components will be omitted. Furthermore, this embodiment will explain a case where this technique is applied to above described Embodiment 4, but this technique is not limited to this and is also applicable to each of the embodiments described so far.

At least one of a parameter indicating the degree of the pitch periodicity and a parameter indicating the length of the pitch period is input from input terminal 706. This embodiment will explain a case where a parameter indicating the degree of the pitch periodicity and a parameter indicating the length with pitch period are input. Furthermore, this embodiment will be explained assuming that pitch period P and pitch gain Pg obtained by an adaptive codebook search by CELP (not shown) are input from input terminal 706.

Search range determining section 707 determines a search range using pitch period P and pitch gain Pg given from input terminal 706. First, search range determining section 707 judges the degree of the periodicity of the input signal based on the magnitude of pitch gain Pg. When pitch gain Pg is larger than a threshold, the input signal input from input terminal 701 is regarded as a voiced sound part and TMIN and TMAX indicating the search range of pitch coefficient T are determined so as to include at least one harmonic of the harmonic structure expressed by pitch period P. Therefore, when the frequency of pitch period P is large, the search range of pitch coefficient T is set to be wide, and on the contrary when the frequency of pitch period P is small, the search range of pitch coefficient T is set to be narrow.

When pitch gain Pg is smaller than the threshold, the input signal input from input terminal 701 is assumed to be a silence part and no harmonic structure is assumed to exist, and therefore the search range for searching pitch coefficient T is set to be very narrow.

Embodiment 8

Figure 17:
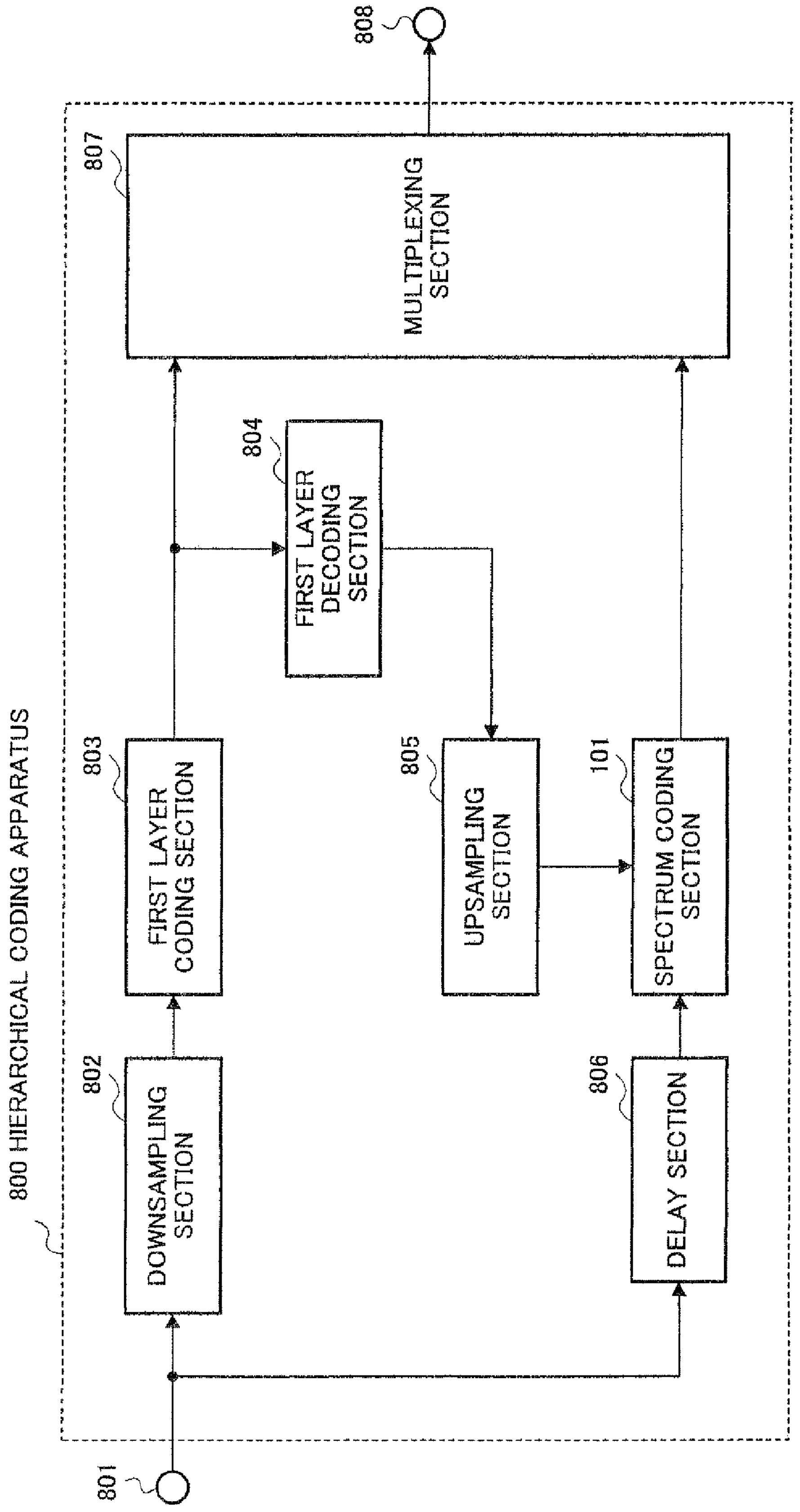
FIG. 17 is a block diagram showing the configuration of a hierarchic coding apparatus according to Embodiment 7.

FIG. 17 is a block diagram showing the configuration of hierarchical coding apparatus 800 according to Embodiment 8 of the present invention. This embodiment applies any one of above described Embodiments 1 to 7 to hierarchical coding, and can thereby code a voice signal or audio signal at a low bit rate Acoustic data is input from input terminal 801 and a low sampling rate signal is generated by downsampling section 802. The downsampled signal is given to first layer coding section 803 and the relevant signal is coded. The code of first layer coding section 803 is given to multiplexing section 807 and is also given to first layer decoding section 804. First layer decoding section 804 generates a first layer decoded signal based on the code.

Next, upsampling section 805 raises the sampling rate of the decoded signal of first layer coding section 803. Delay section 806 gives a delay of a specific length to the input signal input from input terminal 801. The magnitude of this delay is set to the same value as the time delay produced by downsampling section 802, first layer coding section 803, first layer decoding section 804 and upsampling section 805.

Any one of above described Embodiments 1 to 7 is applied to spectrum coding section 101, spectrum coding is performed using the signal obtained from upsampling section 805 as a first signal and the signal obtained from delay section 806 as a second signal and the codes are output to multiplexing section 807.

The code obtained from first layer coding section 803 and the code obtained from spectrum coding section 101 are multiplexed by multiplexing section 807 and are output from output terminal 808 as the output code.

Figure 18:
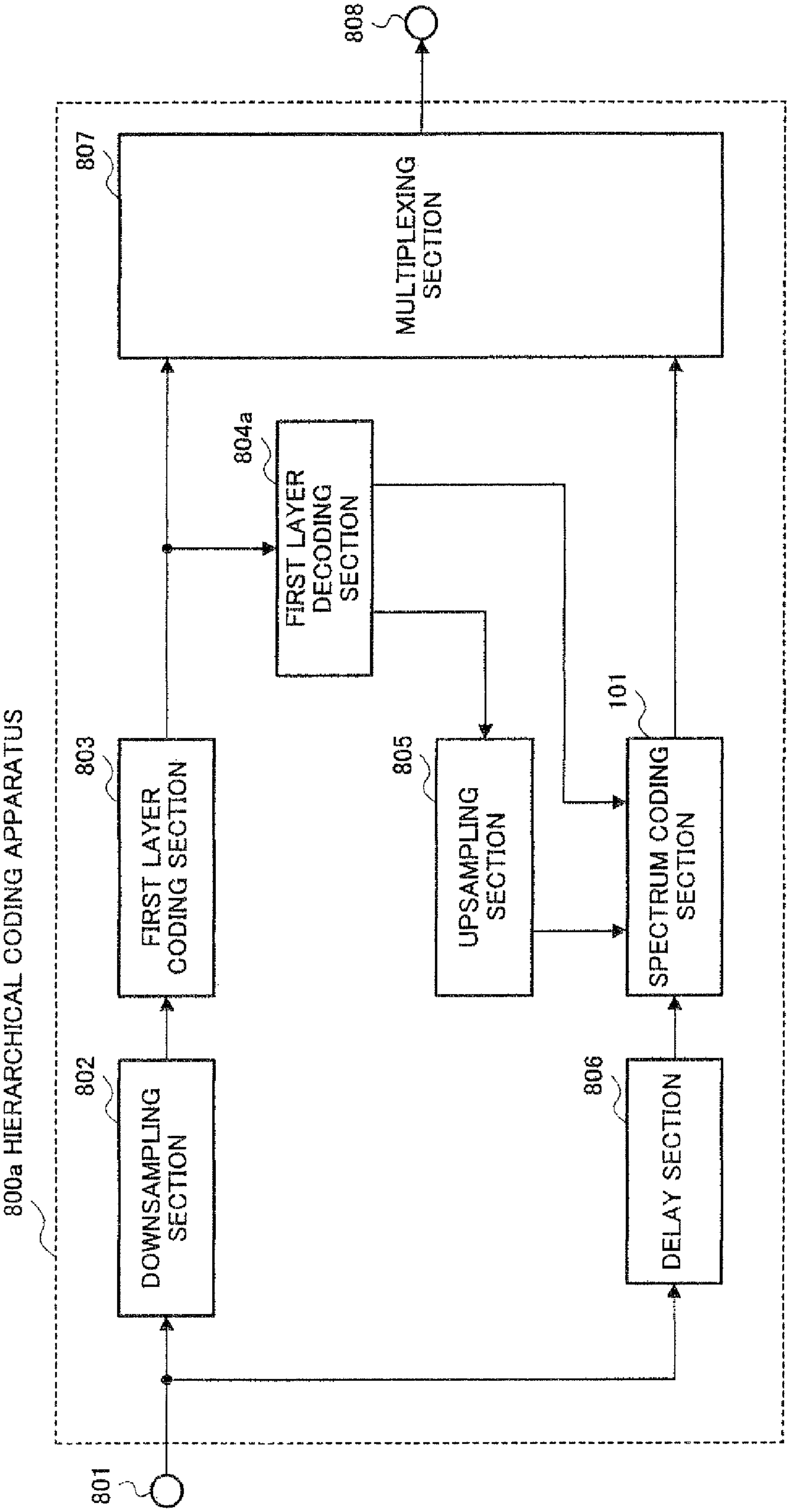
FIG. 18 is a block diagram showing the configuration of a hierarchic coding apparatus according to Embodiment 8.

When the configuration of spectrum coding section 101 is the one shown in FIG. 14 and FIG. 16, the configuration of hierarchical coding apparatus 800*a* according to this embodiment (lowercase alphabet is appended to distinguish it from hierarchical coding apparatus 800 shown in FIG. 17) is as shown in FIG. 18. The difference between FIG. 18 and FIG. 17 is that a signal line which is directly input from first layer decoding section 804*a* is added to spectral coding section 101. This shows that the LPC coefficients decoded by first layer decoding section 804 or pitch period P and pitch gain Pg are given to spectral coding section 101.

Embodiment 9

Figure 19:
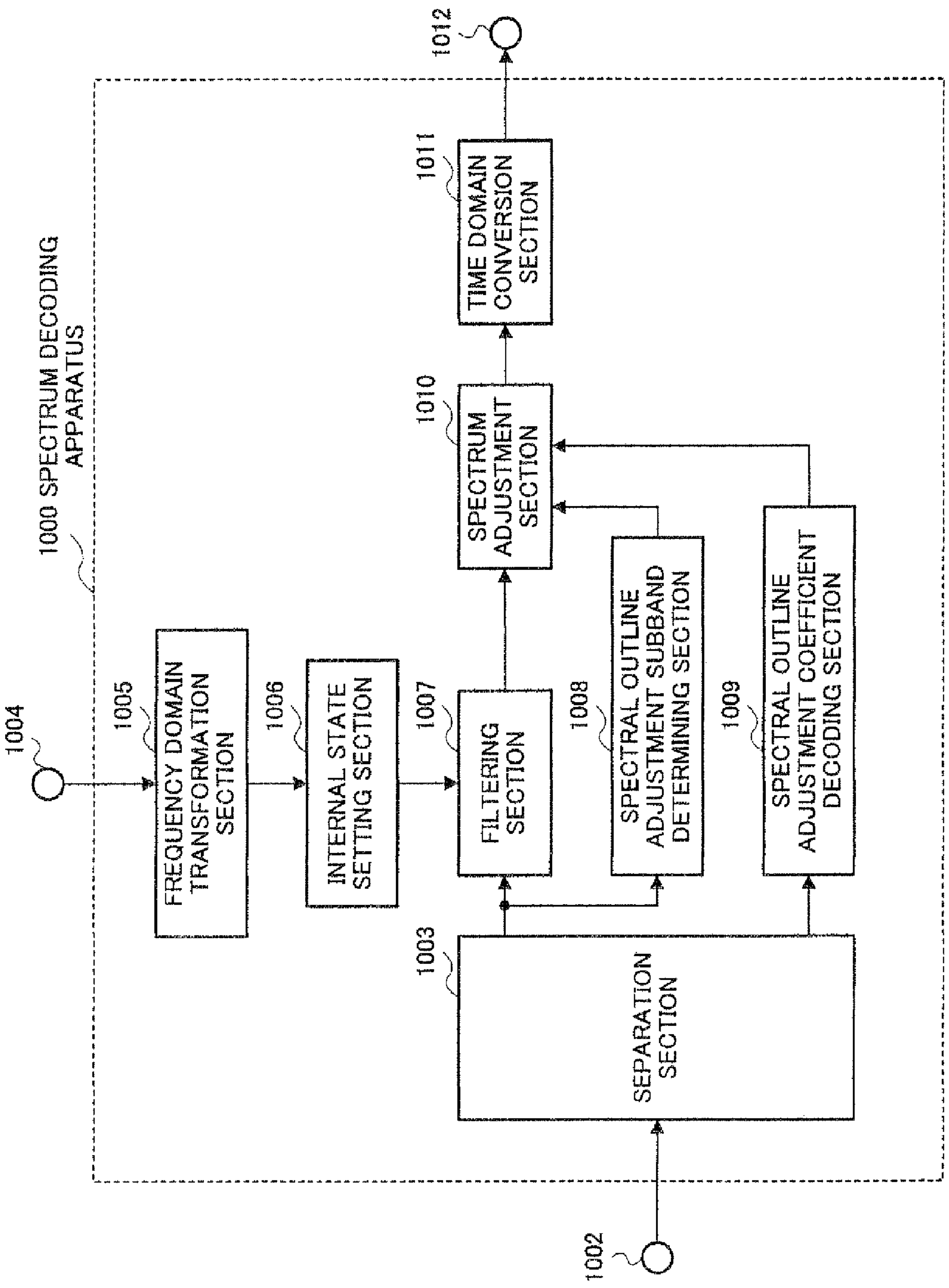
FIG. 19 is a block diagram showing the configuration of a spectrum decoding apparatus according to Embodiment 9.

FIG. 19 is a block diagram showing the configuration of spectrum decoding apparatus 1000 according to Embodiment 9 of the present invention.

In this embodiment, it is possible to estimate the high-frequency component of a second spectrum by a filter based on a first spectrum and decode a generated code, thereby decode an accurately estimated spectrum, adjust a spectral outline of the estimated spectrum of the high-frequency band with an appropriate subband and thereby achieve the effect of improving the quality of the decoded signal. The code coded by a spectrum coding section (not shown here) is input from input terminal 1002 and is given to separation section 1003. Separation section 1003 gives information about a filter coefficient to filtering section 1007 and spectral outline adjustment subband determining section 1008. At the same time, it gives information about a spectral outline adjustment coefficient to spectral outline adjustment coefficient decoding section 1009.

Moreover, a first signal whose effective frequency band is $0 \leqq k < FL$ is input from input terminal 1004 and frequency domain transformation section 1005 performs a frequency transformation on a time domain signal input from input terminal 1004 and calculates first spectrum $S1(k)$. Here, as the frequency transformation method, a discrete Fourier transform (DFT), discrete cosine transform (DCT), modified discrete cosine transform (MDCT) and so on can be used.

Next, internal state setting section 1006 sets the internal state of a filter used at filtering section 1007 using first spectrum S1(*k*). Filtering section 1007 performs filtering based on the internal state of the filter set by internal state setting section 1006, pitch coefficient Tmax given from separation section 1003 and filter coefficient β and calculates estimated value D2(*k*) of the second spectrum. In this case, at filtering section 1007, the filter described in Expression (1) is used. Furthermore, when the filter described in Expression (12) is used, it is only pitch coefficient Tmax that is given from separation section 1003. Which filter should be used corresponds to the type of the filter used by the spectrum coding section (not shown here) and the filter identical to that filter is used.

Figure 20:
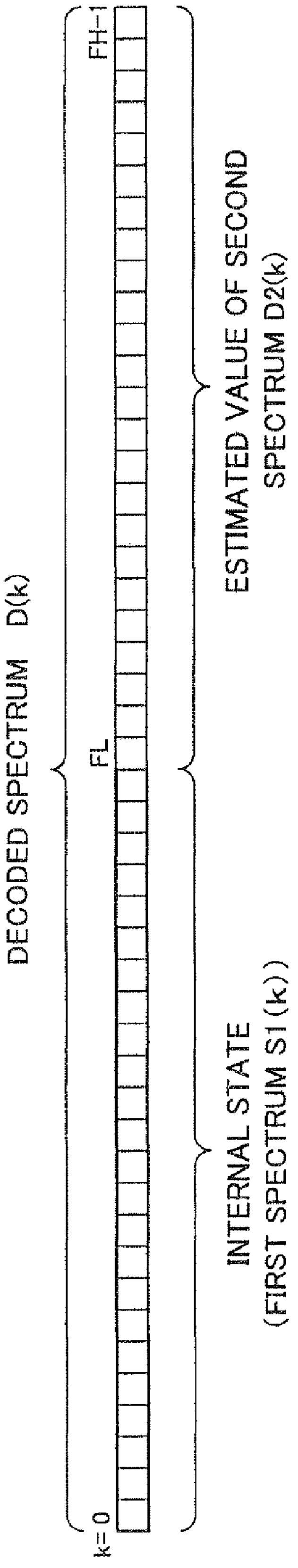
FIG. 20 illustrates the state of a decoded spectrum generated from the filtering section according to Embodiment 9.

The state of decoded spectrum D(k) generated from filtering section 1007 is shown in FIG. 20. As shown in FIG. 20, decoding spectrum D(k) consists of first spectrum S1(*k*) in frequency band 0≦k<FL and estimated value D2(*k*) of the second spectrum in frequency band FL≦k<FH.

Spectral outline adjustment subband determining section 1008 determines the subband for adjusting a spectral outline using pitch coefficient Tmax given from separation section 1003. A jth subband can be expressed as shown in the following Expression (20) using pitch coefficient Tmax.

$$\begin{cases} BL(j) = FL + (j-1)\cdot T_{max} \\ BH(j) = FL + j\cdot T_{max} \end{cases} \quad (0 \le j < J) \tag{20}$$

Here, BL(j) denotes a minimum frequency of the jth subband and BH(j) denotes a maximum frequency of the jth subband. Furthermore, the number of subbands J is expressed as a minimum integer corresponding to maximum frequency BH(J−1) of the (J−1)th subband that exceeds FH. The information about the spectral outline adjustment subband determined in this way is given to spectrum adjustment section 1010.

Spectral outline adjustment coefficient decoding section 1009 decodes a spectral outline adjustment coefficient based on the information about the spectral outline adjustment coefficient given from separation section 1003 and gives this decoded spectral outline adjustment coefficient to spectrum adjustment section 1010. Here, the spectral outline adjustment coefficient quantizes the amount of variation for each subband expressed by Expression (8) and then expresses the decoded value Vq(j).

Spectrum adjustment section 1010 multiplies decoded spectrum D(k) obtained from filtering section 1007 by decoded value Vq(j) of the amount of variation for each subband decoded by spectral outline adjustment coefficient decoding section 1009 on the subband given from spectral outline adjustment subband determining section 1008 according to the following Expression (21), thereby adjusts the spectral shape of frequency band FL≦k<FH of decoded spectrum D(k) and generates decoded spectrum S3(*k*) after adjustment.

$$S3(k)=D(k)\cdot V_q(j)(BL(j)\leqq k\leqq BH(j), \text{ for all } j) \tag{21}$$

This decoded spectrum S3(*k*) is given to time domain conversion section 1011, converted to a time domain signal and output from output terminal 1012. When converting decoded spectrum S3(*k*) to a time domain signal, time domain conversion section 1011 performs appropriate processing such as windowing and overlap-add as required and avoids discontinuity which occurs among frames.

Embodiment 10

Figure 21:
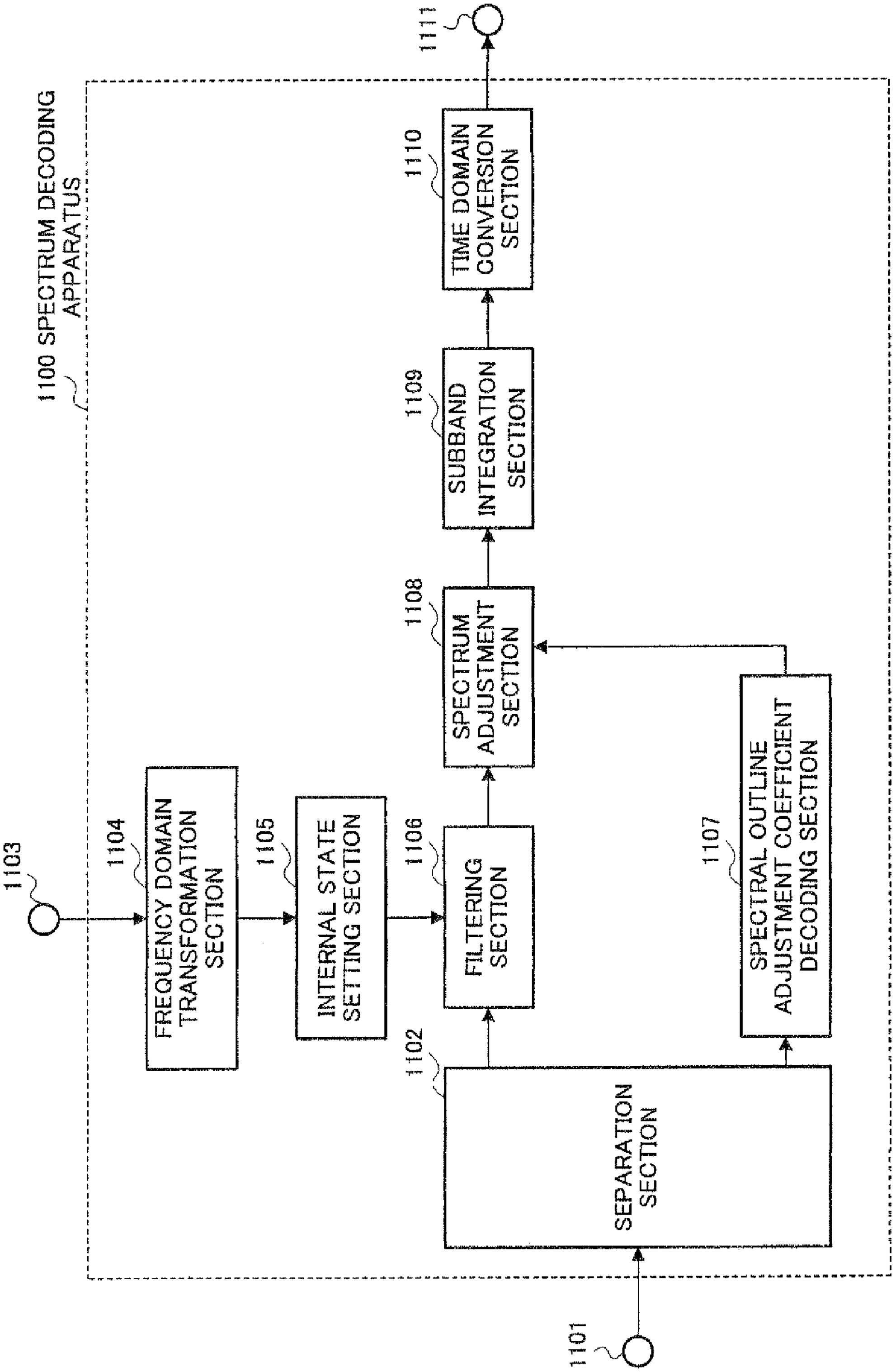
FIG. 21 is a block diagram showing the configuration of a spectrum decoding apparatus according to Embodiment 10.

FIG. 21 is a block diagram showing the configuration of spectrum decoding apparatus 1100 according to Embodiment 10 of the present invention. A feature of this embodiment includes dividing a band of FL≦k<FH into a plurality of subbands beforehand so that a spectrum can be decoded using information about each subband. This avoids the problem of discontinuity of spectral energy caused by spectral tilts included in the spectrum in a band of 0≦k<FL which is the substitution source. In addition, it is possible to decode a code which is coded for each subband independently and generate a high quality decoded signal. In FIG. 21, components having the same names as those in FIG. 19 have identical functions, and therefore detailed explanations of such components will be omitted.

In this embodiment, band FL≦k<FH is divided into predetermined J subbands as shown in FIG. 12, and pitch coefficient Tmax, filter coefficient β and spectral outline adjustment coefficient Vq which are coded for each subband are decoded to generate a voice signal. Or pitch coefficient Tmax and spectral outline adjustment coefficient Vq which are coded for each subband are decoded to generate a voice signal. Which technique should be adopted depends on the kind of the filter used at the spectral coding section (not shown here). The filter in Expression (1) is used in the former case and the filter in Expression (12) is used in the latter case.

Figure 22:
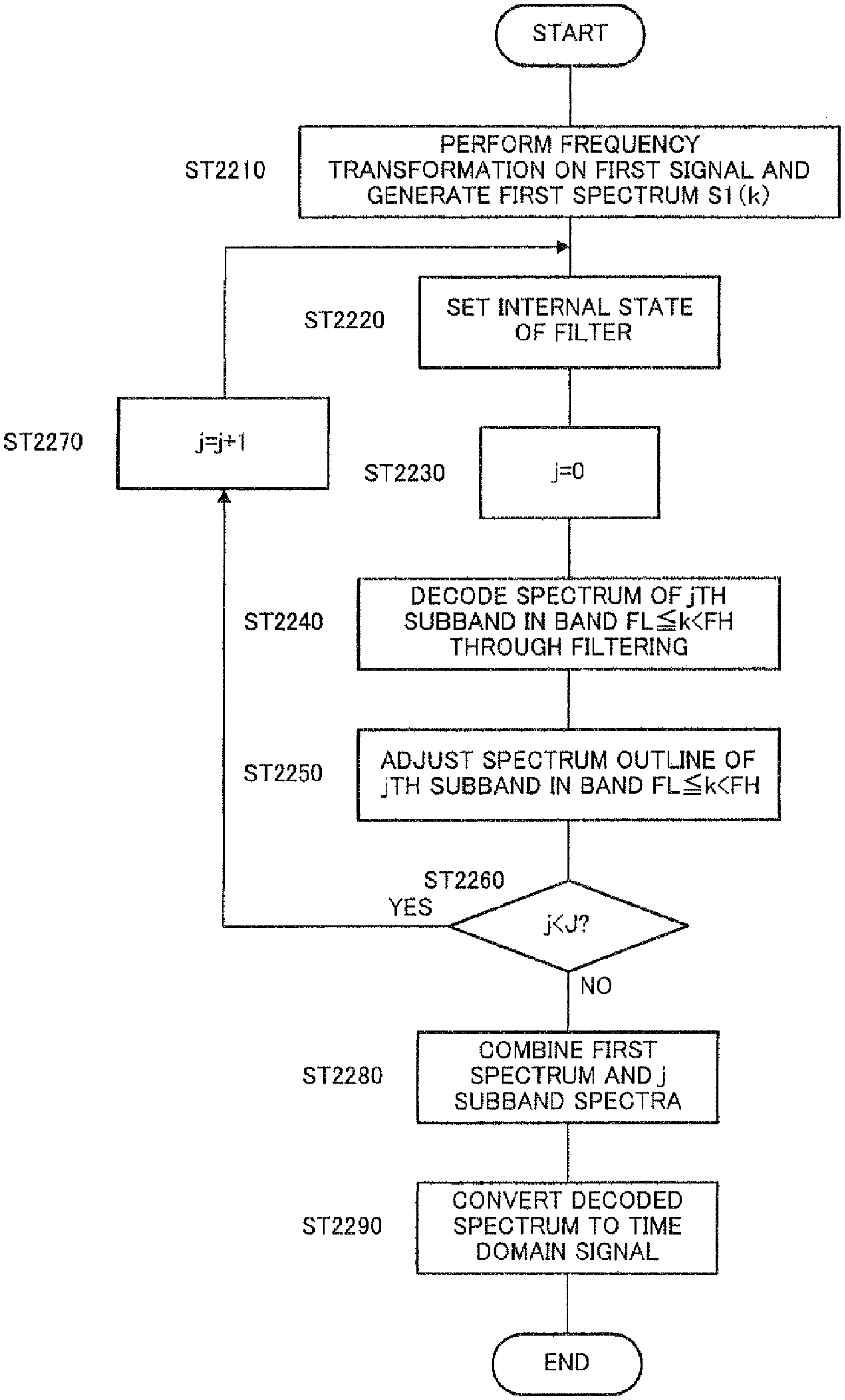
FIG. 22 is a flow chart of Embodiment 10.

First spectrum S1(*k*) is stored in band 0≦k<FL from spectrum adjustment section 1108 and as for band FL≦k<FH, the spectrum after spectral outline adjustment which has been divided into J subbands is given to subband integration section 1109. Subband integration section 1109 combines these spectra and generates decoded spectrum D(k) as shown in FIG. 20. Decoding spectrum D(k) generated in this way is given to time domain conversion section 1110. The flow chart of this embodiment is shown in FIG. 22.

Embodiment 11

Figure 23:
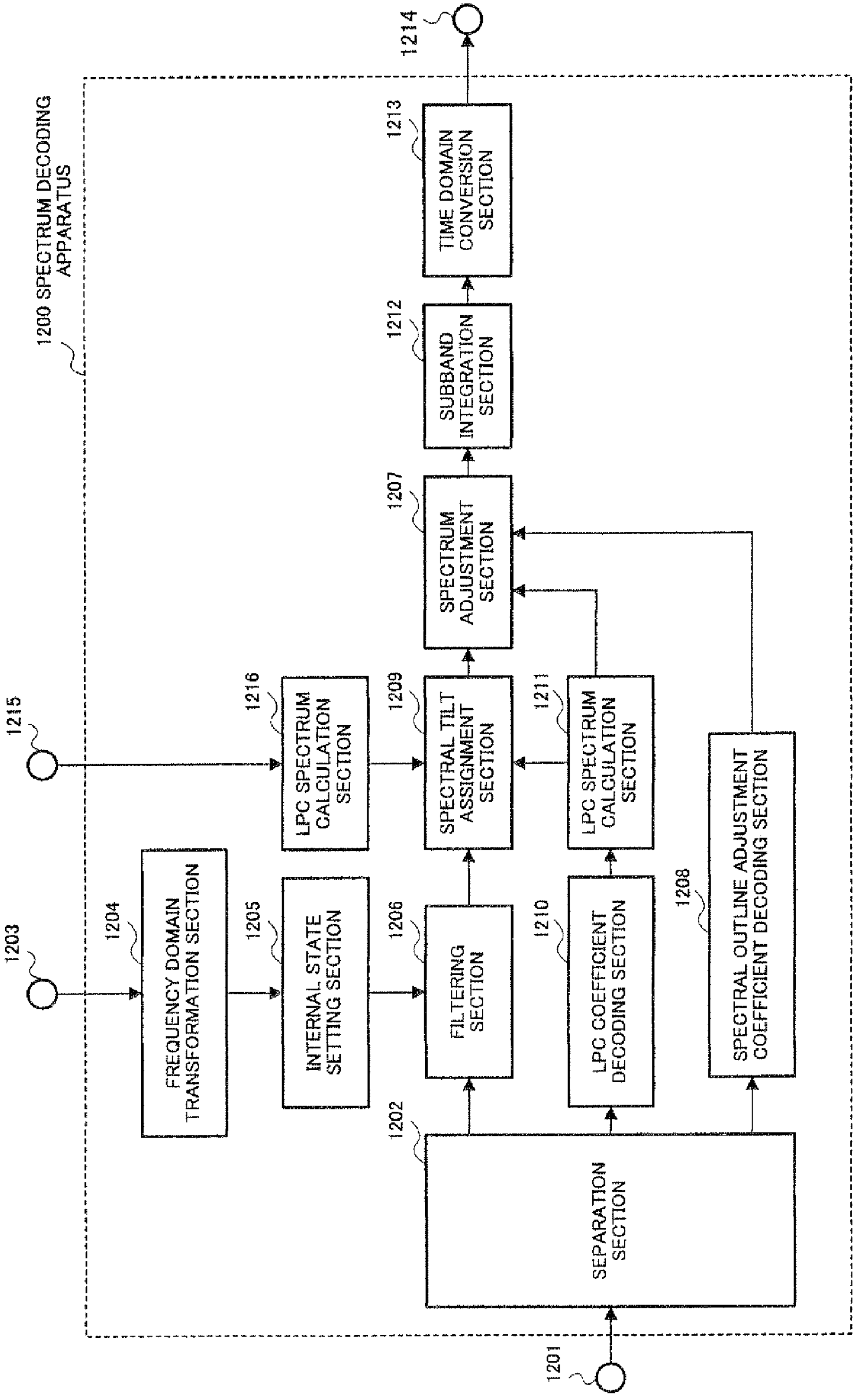
FIG. 23 is a block diagram showing the configuration of a spectrum decoding apparatus according to Embodiment 11.

FIG. 23 is a block diagram showing the configuration of spectrum decoding apparatus 1200 according to Embodiment 11 of the present invention. Features of this embodiment include correcting spectral tilts of first spectrum S1(*k*) and second spectrum S2(*k*) using an LPC spectrum respectively and decoding a code that can be obtained by calculating estimated value D2(*k*) of the second spectrum using the corrected spectra. This makes it possible to obtain a spectrum free of the problem of discontinuity of spectral energy and produces the effect of generating a high quality decoded signal. In FIG. 23, components having the same names as those in FIG. 21 have identical functions, and therefore detailed explanations of such components will be omitted. Furthermore, this embodiment will explain a case where a technique of correcting spectral tilts is applied to above described Embodiment 10, but this technique is not limited to this and is also applicable to above described Embodiment 9.

LPC coefficient decoding section 1210 decodes LPC coefficients based on information about the LPC coefficients given from Separation section 1202 and gives the LPC coefficients to LPC spectrum calculation section 1211. The processing by LPC coefficient decoding section 1210 depends on the coding processing on the LPC coefficients which is performed inside the LPC analysis section of a coding section (not shown here) and processing of decoding the code obtained through the coding processing there is performed. LPC spectrum calculation section 1211 calculates the LPC spectrum according to Expression (14) or Expression (15). The same method as that used by the LPC spectrum calculation section of the coding section (not shown here) can be used to determine which method should be used. The LPC spectrum calculated by LPC spectrum calculation section 1211 is given to spectral tilt assignment section 1209.

On the other hand, the LPC coefficients calculated by the LPC decoding section (not shown here) or the LPC calculation section is input from input terminal 1215 and is given to LPC spectrum calculation section 1216. LPC spectrum calculation section 1216 calculates the LPC spectrum according to Expression (14) or Expression (15). Which expression should be used depends on what method is used by the coding section (not shown here).

Spectral tilt assignment section 1209 multiplies decoded spectrum D(k) given from filtering section 1206 by the spectral tilt according to the following Expression (22), and then gives decoded spectrum D(k) assigned a spectral tilt to spectrum adjustment section 1207. In Expression (22), e1($k$) denotes the output of LPC spectrum calculation section 1216 and e2($k$) denotes the output of LPC spectrum calculation section 1211.

$$D2new(k) = \frac{D2(k)}{e1(k)} \cdot e2(k) \tag{22}$$

Embodiment 12

Figure 24:
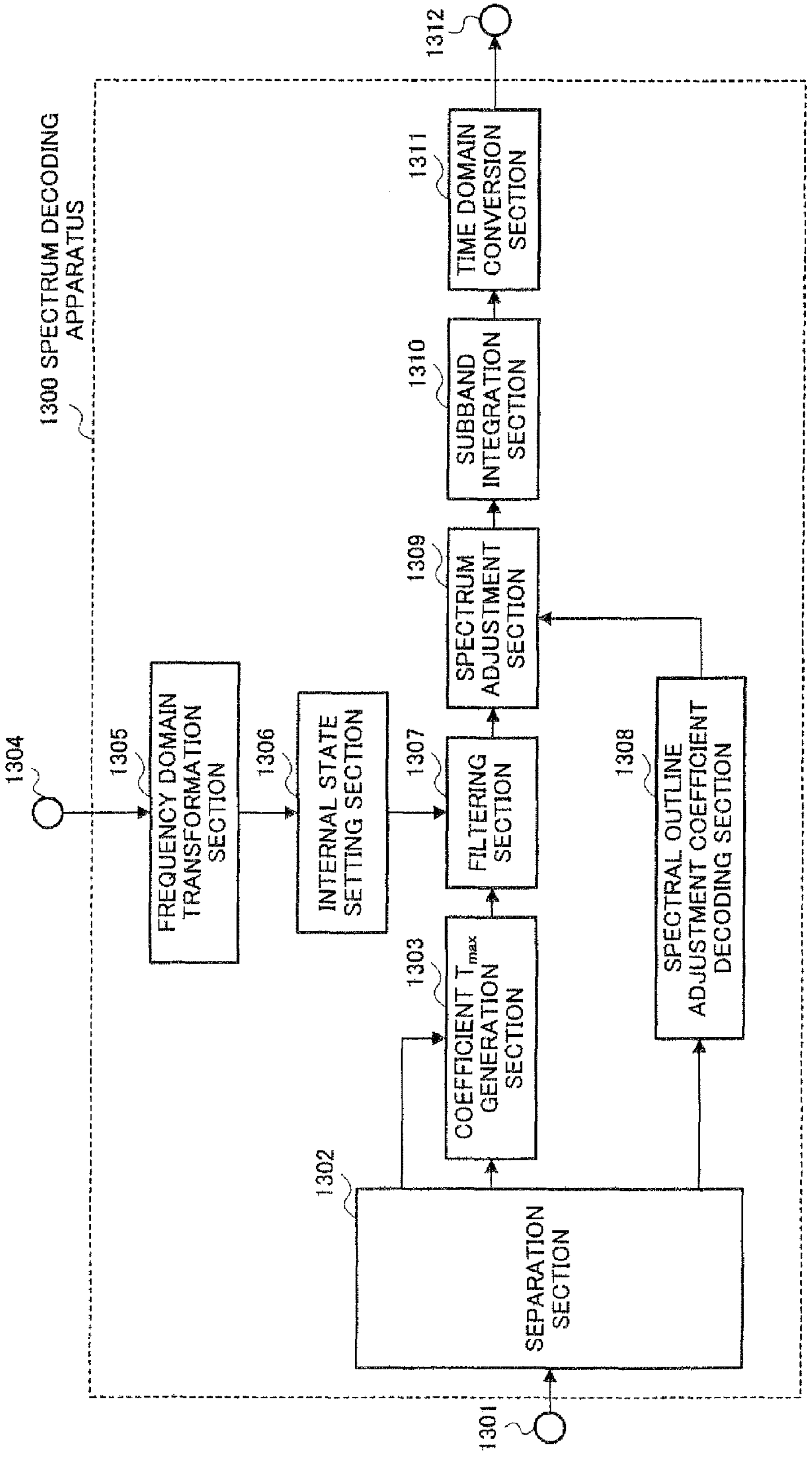
FIG. 24 is a block diagram showing the configuration of a spectrum decoding apparatus according to Embodiment 12.

FIG. 24 is a block diagram showing the configuration of spectrum decoding apparatus 1300 according to Embodiment 12 of the present invention. Feature of this embodiment include detecting a band in which the spectrum has a relatively flat shape from within first spectrum S1($k$) and decoding a code obtained by searching pitch coefficient T from this flat band.

This prevents the energy of the spectrum after substitution from becoming discontinuous, can obtain a decoded spectrum free of the problem of discontinuity of spectral energy and produce the effect of generating a high quality decoded signal. In FIG. 24, components having the same names as those in FIG. 21 have identical functions, and therefore detailed explanations of such components will be omitted. Furthermore, this embodiment will explain a case where this technique is applied to above described Embodiment 10, but this technique is not limited to this and is also applicable to above described Embodiment 9 and Embodiment 11.

Separation section 1302 gives subband selection information n indicating which subband is selected out of the N subbands into which band $0 \leqq k < FL$ is divided and information indicating which position is used as the start point of the substitution source out of the frequencies included in the nth subband to pitch coefficient Tmax generation section 1303. Pitch coefficient Tmax generation section 1303 generates pitch coefficient Tmax used at filtering section 1307 based on these two pieces of information and gives pitch coefficient Tmax to filtering section 1307.

Embodiment 13

Figure 25:
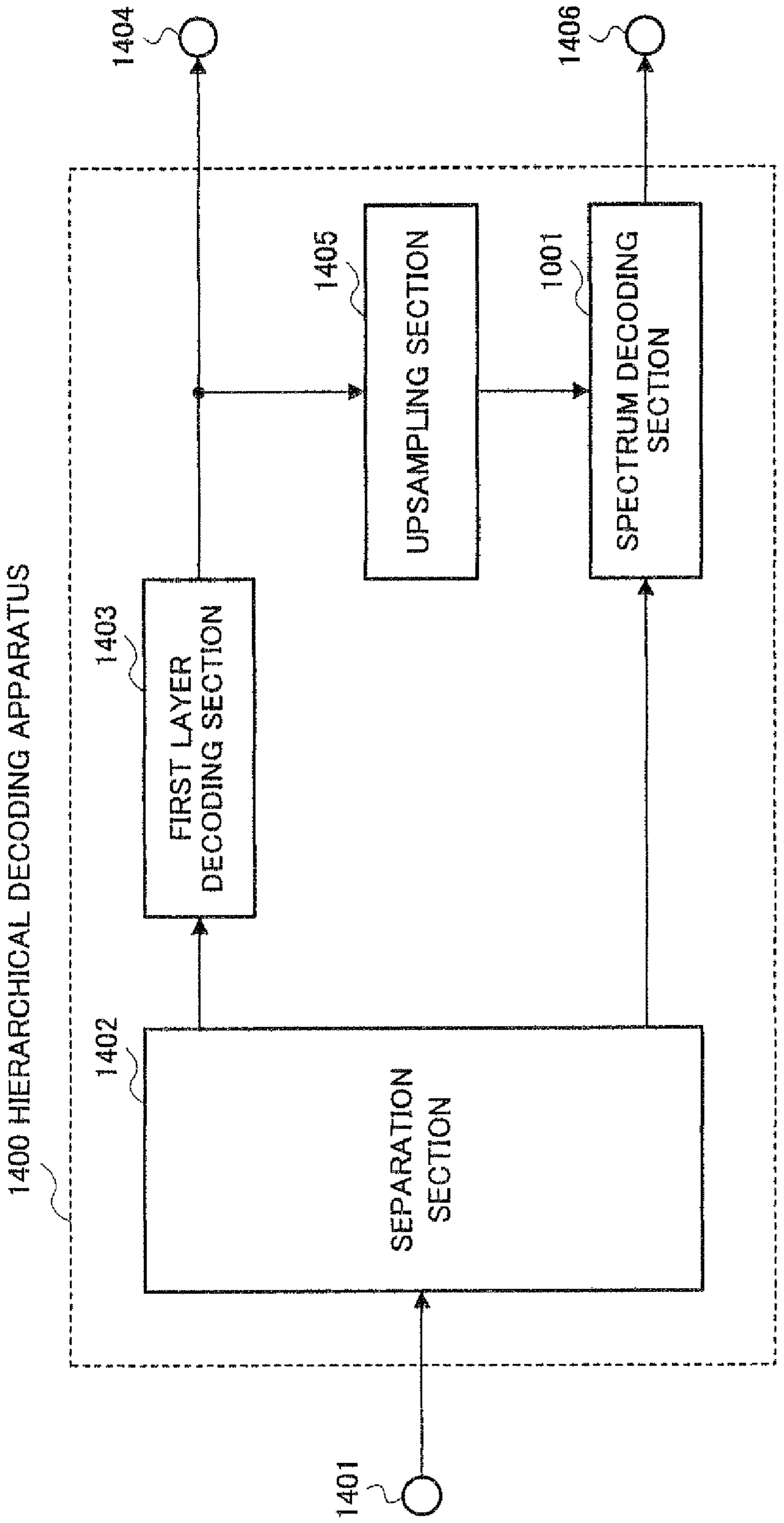
FIG. 25 is a block diagram showing the configuration of a hierarchic decoding apparatus according to Embodiment 13.

FIG. 25 is a block diagram showing the configuration of hierarchical decoding apparatus 1400 according to Embodiment 13 of the present invention. This embodiment applies any one of above described Embodiments 9 to 12 to a hierarchical decoding method, and can thereby decode a code generated by the hierarchical coding method of above described Embodiment 8 and decode a high quality voice signal or audio signal. A code that is coded using a hierarchy signal coding method (not shown here) is input from input terminal 1401, separation section 1402 separates the above described code and generates a code for the first layer decoding section and a code for the spectrum decoding section. First layer decoding section 1403 decodes the decoded signal of sampling rate 2·FL using the code obtained at separation section 1402 and gives the decoded signal to upsampling section 1405. Upsampling section 1405 raises the sampling frequency of the first layer decoded signal given from first layer decoding section 1403 to 2·FH. According to this configuration, when the first layer decoded signal generated by first layer decoding section 1403 needs to be output, the first layer decoded signal can be output from output terminal 1404. When the first layer decoded signal is not necessary, output terminal 1404 can be deleted from the configuration.

The code separated by separation section 1402 and first layer decoded signal after upsampling generated by upsampling section 1405 are given to spectrum decoding section 1001. Spectrum decoding section 1001 performs spectrum decoding based on one of the methods according to above described Embodiments 9 to 12, generates a decoded signal of sampling frequency 2·FH and outputs the signal from output terminal 1406. Spectrum decoding section 1001 performs processing assuming the first layer decoded signal after the upsampling given from upsampling section 1405 as a first signal.

Figure 26:
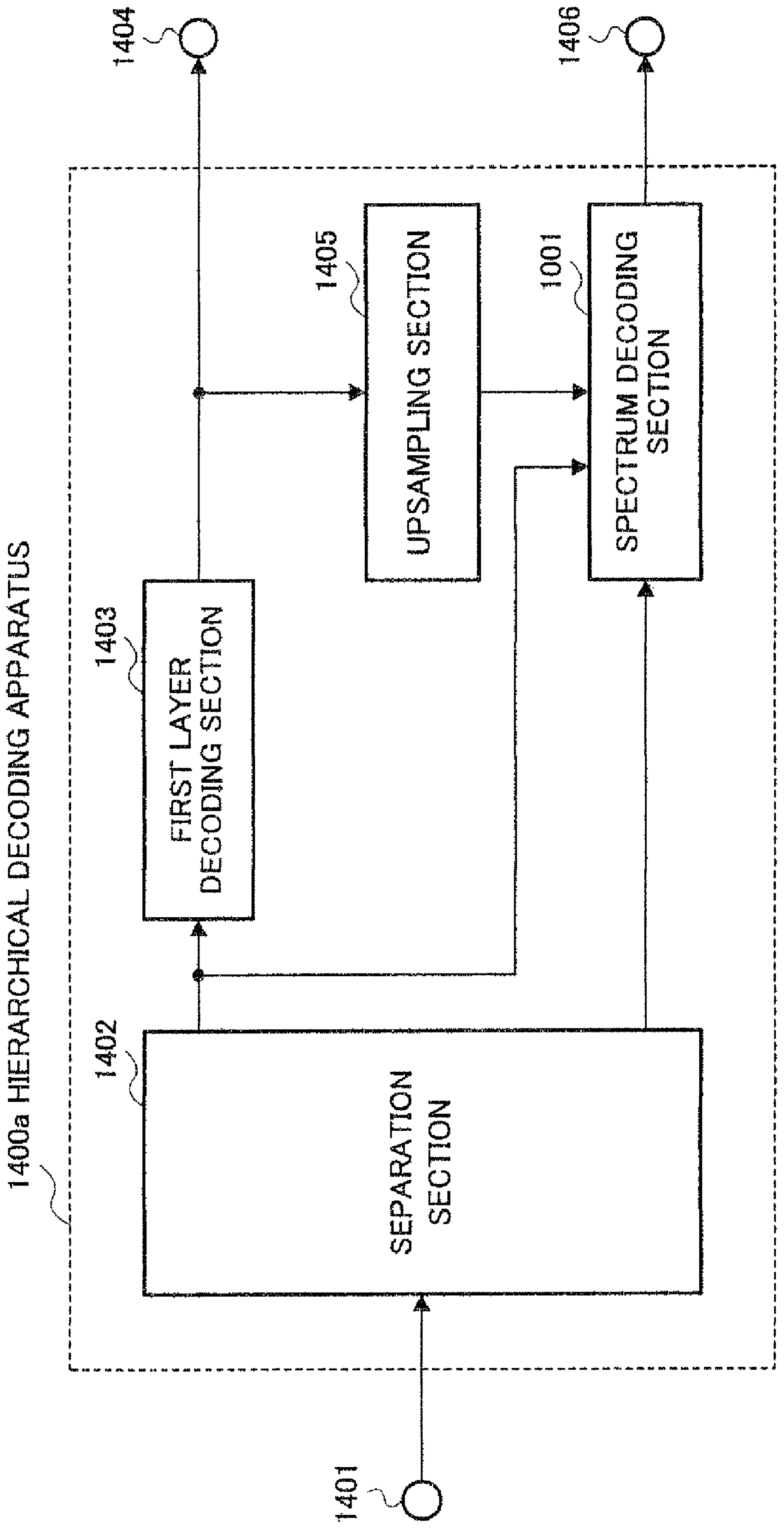
FIG. 26 is a block diagram showing the configuration of the hierarchic decoding apparatus according to Embodiment 13.

When the configuration of spectrum decoding section 1001 is the one shown in FIG. 23, the configuration of hierarchical decoding apparatus 1400$a$ according to this embodiment is as shown in FIG. 26. The difference between FIG. 25 and FIG. 26 is in that the signal line directly input from separation section 1402 is added to spectrum decoding section 1001. This shows that the LPC coefficients decoded by separation section 1402 or pitch period P and pitch gain Pg are given to spectrum decoding section 1001.

Embodiment 14

Figure 27:
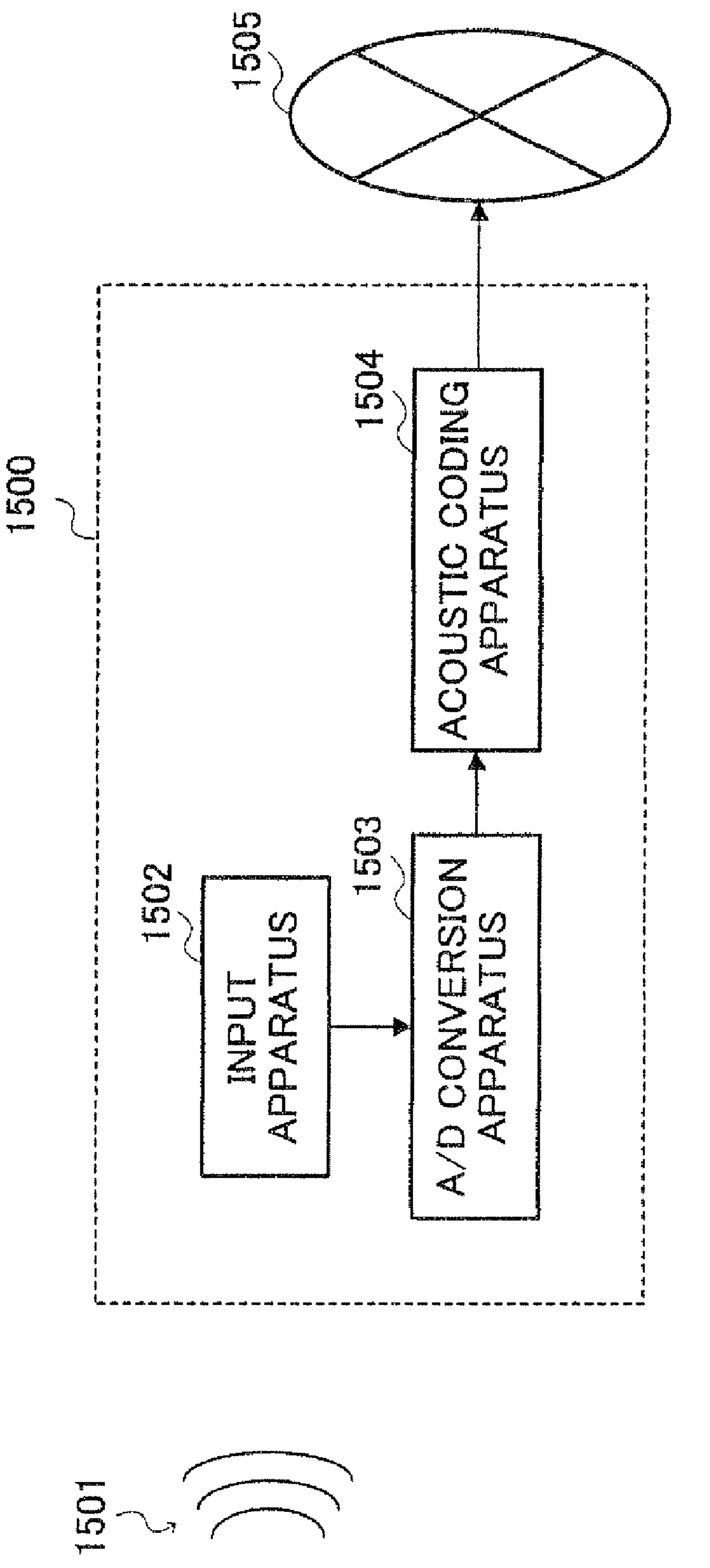
FIG. 27 is a block diagram showing the configuration of an acoustic signal coding apparatus according to Embodiment 14.

Next, Embodiment 14 of the present invention will be explained with reference to drawings. FIG. 27 is a block diagram showing the configuration of acoustic signal coding apparatus 1500 according to Embodiment 14 of the present invention. This embodiment is characterized in that acoustic coding apparatus 1504 in FIG. 27 is constructed of hierarchical coding apparatus 800 shown in above described Embodiment 8.

As shown in FIG. 27, acoustic signal coding apparatus 1500 according to Embodiment 14 of the present invention is provided with input apparatus 1502, A/D conversion apparatus 1503 and acoustic coding apparatus 1504 which is connected to network 1505.

The input terminal of A/D conversion apparatus 1503 is connected to the output terminal of input apparatus 1502. The input terminal of acoustic coding apparatus 1504 is connected to the output terminal of A/D conversion apparatus 1503. The output terminal of acoustic coding apparatus 1504 is connected to network 1505. Input apparatus 1502 converts sound wave 1501 which is audible to human ears to an analog signal which is an electric signal and gives it to A/D conversion apparatus 1503. A/D conversion apparatus 1503 converts an analog signal to a digital signal and gives it to acoustic coding apparatus 1504. Acoustic coding apparatus 1504 codes an input digital signal, generates a code and outputs it to network 1505.

According to Embodiment 14 of the present invention, it is possible to obtain the effect as shown in above described Embodiment 8 and provide an acoustic coding apparatus which codes an acoustic signal efficiently.

Embodiment 15

Figure 28:
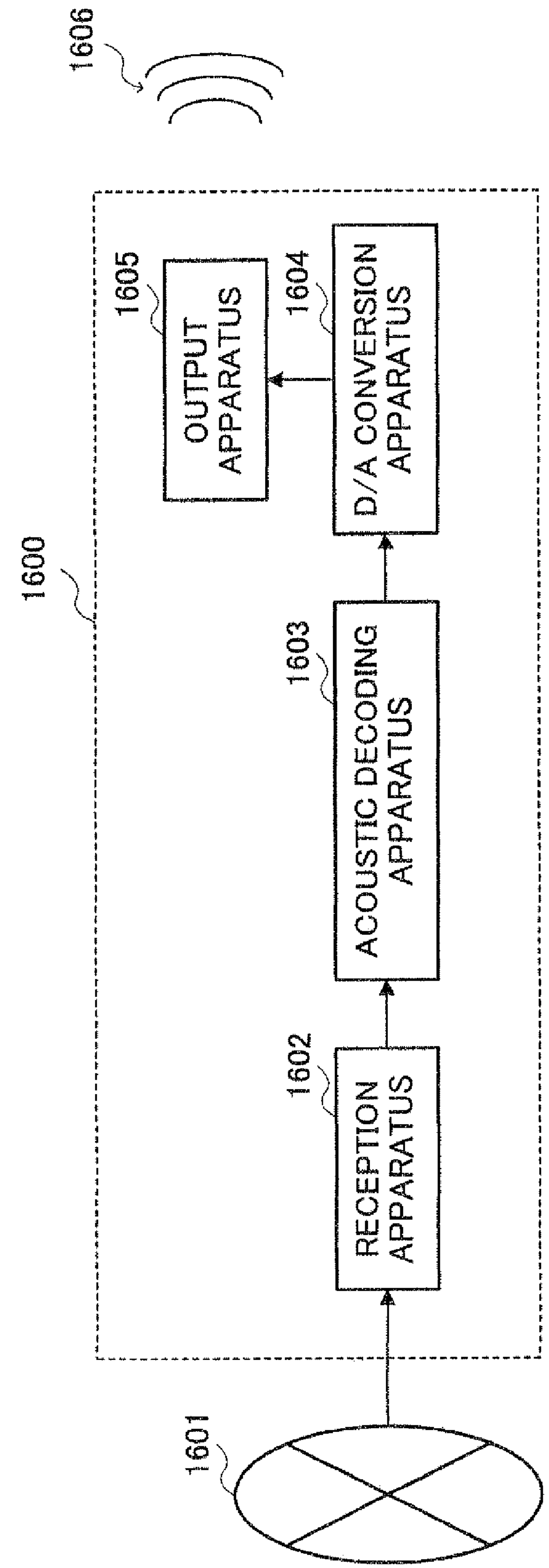
FIG. 28 is a block diagram showing the configuration of an acoustic signal decoding apparatus according to Embodiment 15.

Next, Embodiment 15 of the present invention will be explained with reference to drawings. FIG. 28 is a block diagram showing the configuration of acoustic signal decoding apparatus 1600 according to Embodiment 15 of the present invention. This embodiment is characterized in that acoustic decoding apparatus 1603 shown in FIG. 28 is constructed of hierarchical decoding apparatus 1400 shown in above described Embodiment 13.

As shown in FIG. 28, acoustic signal decoding apparatus 1600 according to Embodiment 15 of the present invention is provided with reception apparatus 1602 which is connected to network 1601, acoustic decoding apparatus 1603, D/A conversion apparatus 1604 and output apparatus 1605.

The input terminal of reception apparatus 1602 is connected to network 1601. The input terminal of acoustic decoding apparatus 1603 is connected to the output terminal of reception apparatus 1602. The input terminal of D/A conversion apparatus 1604 is connected to the output terminal of voice decoding apparatus 1603. The input terminal of output apparatus 1605 is connected to the output terminal of D/A conversion apparatus 1604.

Reception apparatus 1602 receives a digital coded acoustic signal from network 1601, generates a digital reception acoustic signal and gives it to acoustic decoding apparatus 1603. Voice decoding apparatus 1603 receives a reception acoustic signal from reception apparatus 1602, performs decoding processing on this reception acoustic signal, generates a digital decoded acoustic signal and gives it to D/A conversion apparatus 1604. D/A conversion apparatus 1604 converts the digital decoded voice signal from acoustic decoding apparatus 1603, generates an analog decoded voice signal and gives it to output apparatus 1605. Output apparatus 1605 converts the analog decoded acoustic signal which is an electric signal to vibration of the air and outputs it as sound wave 1606 audible to human ears.

According to Embodiment 15 of the present invention, it is possible to obtain the effect as shown in above described Embodiment 13 and efficiently perform decoding the coded acoustic signal with a small number of bits and thereby output a high quality acoustic signal.

Embodiment 16

Figure 29:
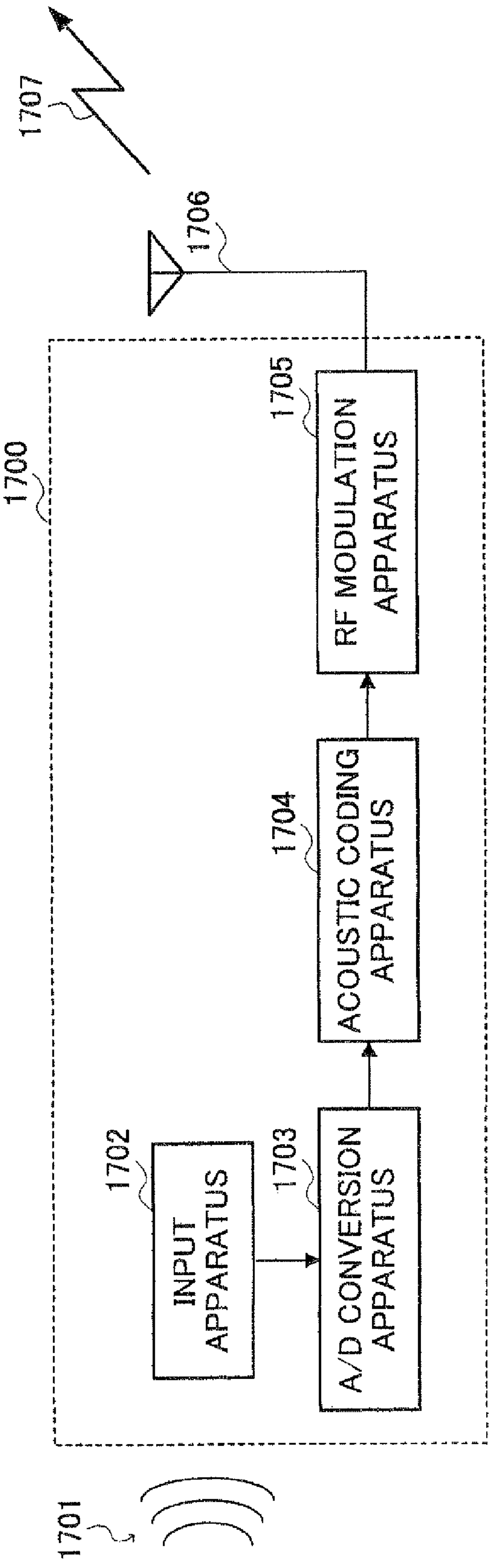
FIG. 29 is a block diagram showing the configuration of an acoustic signal transmission coding apparatus according to Embodiment 16.

Next, Embodiment 16 of the present invention will be explained with reference to drawings. FIG. 29 is a block diagram showing the configuration of acoustic signal transmission coding apparatus 1700 according to Embodiment 16 of the present invention. Embodiment 16 of the present invention is characterized in that acoustic coding apparatus 1704 in FIG. 29 is constructed of hierarchical coding apparatus 800 shown in above described Embodiment 8.

As shown in FIG. 29, Acoustic signal transmission coding apparatus 1700 according to Embodiment 16 of the present invention is provided with input apparatus 1702, A/D conversion apparatus 1703, acoustic coding apparatus 1704, RF modulation apparatus 1705 and antenna 1706.

Input apparatus 1702 converts sound wave 1701 which is audible to human ears to an analog signal which is an electric signal and gives it to A/D conversion apparatus 1703. A/D conversion apparatus 1703 converts an analog signal to a digital signal and gives it to acoustic coding apparatus 1704. Acoustic coding apparatus 1704 codes the input digital signal, generates a coded acoustic signal and gives it to RE modulation apparatus 1705. RF modulation apparatus 1705 modulates the coded acoustic signal, generates a modulated coded acoustic signal and gives it to antenna 1706. Antenna 1706 transmits the modulated coded acoustic signal as radio wave 1707.

According to Embodiment 16 of the present invention, it is possible to obtain the effect as shown in above described Embodiment 8 and efficiently code the acoustic signal with a small number of bits.

The present invention can be applied to a transmission apparatus, transmission coding apparatus or acoustic signal coding apparatus that uses an audio signal. Furthermore, the present invention can also be applied to a mobile station apparatus or base station apparatus.

Embodiment 17

Figure 30:
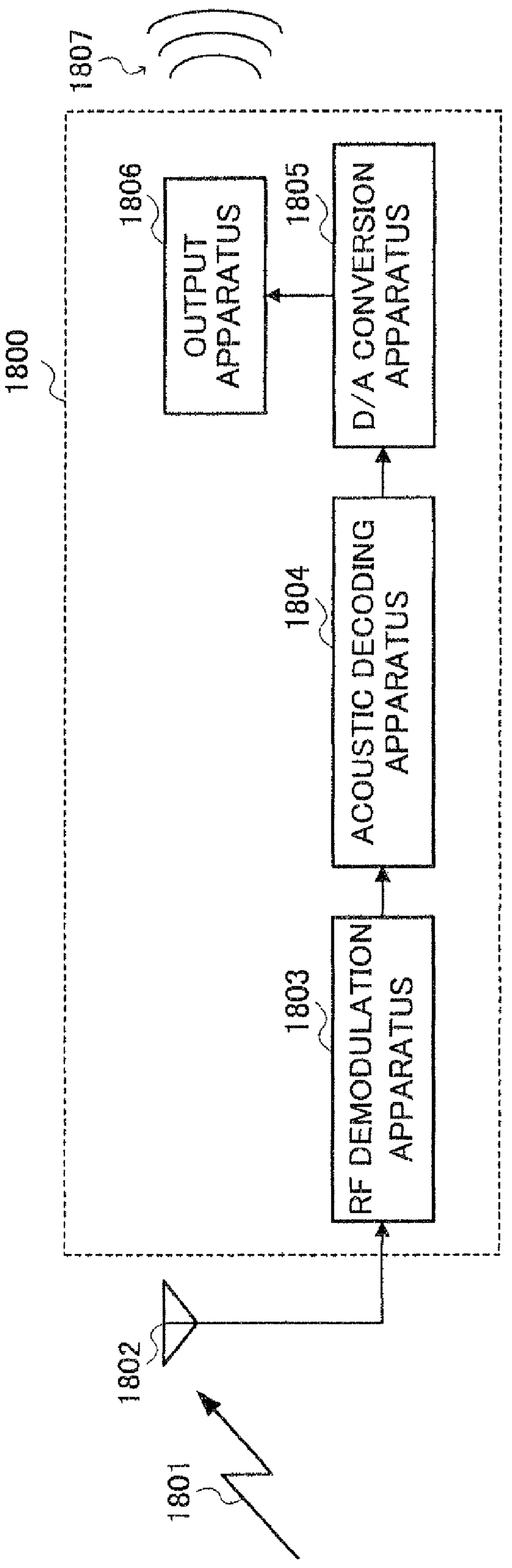
FIG. 30 is a block diagram showing the configuration of an acoustic signal reception decoding apparatus according to Embodiment 17 of the present invention.

Next, Embodiment 17 of the present invention will be explained with reference to drawings. FIG. 30 is a block diagram showing the configuration of acoustic signal reception decoding apparatus 1800 according to Embodiment 17 of the present invention. Embodiment 17 of the present invention is characterized in that acoustic decoding apparatus 1804 in FIG. 30 is constructed of hierarchical decoding apparatus 1400 shown in above described Embodiment 13.

As shown in FIG. 30, acoustic signal reception decoding apparatus 1800 according to Embodiment 17 of the present invention is provided with antenna 1802, RF demodulation apparatus 1803, acoustic decoding apparatus 1804, D/A conversion apparatus 1805 and output apparatus 1806.

Antenna 1802 receives a digital coded acoustic signal as radio wave 1801, generates a digital reception coded acoustic signal which is an electric signal and gives it to RF demodulation apparatus 1803. RF demodulation apparatus 1803 demodulates the reception coded acoustic signal from antenna 1802, generates a demodulated coded acoustic signal and gives it to acoustic decoding apparatus 1804.

Acoustic decoding apparatus 1804 receives a digital demodulated coded acoustic signal from RF demodulation apparatus 1803, performs decoding processing, generates a digital decoded acoustic signal and gives it to D/A conversion apparatus 1805. D/A conversion apparatus 1805 converts the digital decoded voice signal from acoustic decoding apparatus 1804, generates an analog decoded voice signal and gives it to output apparatus 1806. Output apparatus 1806 converts the analog decoded voice signal which is an electric signal to vibration of the air and outputs it as sound wave 1807 audible to human ears.

According to the Embodiment 17 of the present invention, it is possible to obtain the effect as shown in above described Embodiment 13, decode a coded acoustic signal efficiently with a small number of bits and thereby output a high quality acoustic signal.

As explained above, according to the present invention, by estimating a high-frequency band of a second spectrum using a filter having a first spectrum as its internal state, coding a filter coefficient when the degree of similarity to the estimated value of the second spectrum becomes a maximum and adjusting a spectral outline with an appropriate subband, it is possible to code the spectrum at a low bit rate and with high quality. Moreover, by applying the present invention to hierarchical coding, a voice signal and audio signal can be coded at a low bit rate and with high quality.

The present invention can be applied to a reception apparatus, reception decoding apparatus or voice signal decoding apparatus using an audio signal. Furthermore, the present invention can also be applied to a mobile station apparatus or base station apparatus.

Furthermore, each function block employed in the description of each of the aforementioned embodiments may typically be implemented as an LSI constituted by an integrated circuit. These may be individual chips or partially or totally contained on a single chip.

Furthermore, LSI is adopted here, but this may also be referred to as "IC", "system LSI", "super LSI" or "ultra LSI" depending on the differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. The adaptation of a biotechnology and so on may be considered as possibilities.

A first mode of the spectrum coding method of the present invention is a spectrum coding method comprising a section for performing the frequency transformation of a first signal and calculating a first spectrum, a section for performing the frequency transformation of a second signal and calculating a second spectrum, a step of estimating the shape of the second spectrum in a band of $FL \leqq k < FH$ using a filter which has the first spectrum in a band of $0 \leqq k < FL$ as an internal state and a step of coding a coefficient indicating the filter characteristic at this time, wherein the outline of the second spectrum determined based on the coefficient indicating the filter characteristic is coded together.

According to this configuration, it is only necessary to code the coefficient indicating the characteristic of the filter by estimating the high-frequency component of second spectrum $S2(k)$ using the filter based on first spectrum $S1(k)$ and it is possible to estimate the high-frequency component of second spectrum $S2(k)$ at a low bit rate and with high accuracy.

Moreover, since a spectral outline is coded based on the coefficient indicating the characteristic of the filter, no discontinuity of energy of the spectrum occurs and thereby it is possible to improve quality.

Furthermore, a second mode of the spectrum coding method of the present invention divides the second spectrum into a plurality of subbands and codes the coefficient indicating the characteristic of the filter and the outline of the spectrum for each subband.

According to this configuration, by estimating the high-frequency component of second spectrum $S2(k)$ using the filter based on first spectrum $S1(k)$, it is only necessary to code the coefficient indicating the characteristic of the filter and estimate the high-frequency component of second spectrum $S2(k)$ at a low bit rate and with high accuracy. Furthermore, a plurality of subbands are predetermined and the coefficient indicating the filter characteristic and the outline of the filter are coded for each subband, and therefore it is possible to prevent discontinuity of energy of the spectrum and thereby improve quality.

Furthermore, a third mode of the spectrum coding method of the present invention adopts the above described configuration in which the filter can be expressed by $$P(z) = \frac{1}{1 - \sum_{i=-M}^{M} \beta_i z^{-T+i}} \tag{23}$$

and estimation is performed using a zero-input response of the filter.

According to this configuration, it is possible to prevent collapse of the harmonic structure caused with the estimated value of $S2(k)$ and obtain the effect of improving quality.

Moreover, a fourth mode of the spectrum coding method of the present invention adopts the above described configuration in which $M=0$, $\beta_0=1$ are assumed.

According to this configuration, the characteristic of the filter is determined only by pitch coefficient T and it is possible to obtain the effect that the spectrum can be estimated at a low bit rate.

Furthermore, a fifth mode of the spectrum coding method of the present invention adopts the above described configuration in which the outline of the spectrum is determined for each subband determined by pitch coefficient T.

According to this configuration, since the band width of the subband is determined appropriately, it is possible to prevent discontinuity of energy of the spectrum and improve quality.

Furthermore, a sixth mode of the spectrum coding method of the present invention adopts the above described configuration, in which the first signal is a signal coded and then decoded in a lower layer or a signal obtained by upsampling this signal and the second signal is an input signal.

According to this configuration, it is possible to apply the present invention to hierarchical coding which is composed of a coding section with a plurality of layers and obtain the effect that an input signal can be coded at a low bit rate and with high quality.

A first mode of the spectrum decoding method of the present invention is a spectrum decoding method comprising the steps of decoding a coefficient indicating the characteristic of a filter, performing the frequency transformation of a first signal to obtain a first spectrum and generating an estimated value of a second spectrum in a band of $FL \leqq k < FH$ using the filter which has the first spectrum in a band of $0 \leqq k < FL$ as the internal state, in which the spectral outline of the second spectrum determined based on the coefficient indicating the characteristic of the filter is decoded together.

According to this configuration, it is possible to decode the code obtained by estimating the high-frequency component of second spectrum $S2(k)$ using the filter based on first spectrum $S1(k)$ and thereby obtain the effect that the estimated value of the high-frequency component of second spectrum $S2(k)$ can be decoded with high accuracy. Furthermore, since the spectral outline coded based on the coefficient indicating the characteristic of the filter can be decoded, discontinuity of energy of the spectrum no longer occurs and a high quality decoded signal can be generated.

Furthermore, a second mode of the spectrum decoding method of the present invention comprises the steps of dividing the second spectrum into a plurality of subbands and decoding a coefficient indicating the characteristic of the filter and the outline of the spectrum for each subband.

According to this configuration, it is possible to decode the code which is coded by estimating the high-frequency component of second spectrum $S2(k)$ using the filter based on first spectrum $S1(k)$ and thereby obtain the effect that the estimated value of the high-frequency component of second spectrum $S2(k)$ can be decoded with high accuracy. Furthermore, it is possible to predetermine a plurality of subbands and decode the coefficient indicating the characteristic of the filter coded and outline of the spectrum for each subband, and thereby discontinuity of energy of the spectrum is prevented and a high quality decoded signal can be generated.

Moreover, a third mode of the spectrum decoding method of the present invention adopts the above described configuration in which the filter is expressed $$P(z) = \frac{1}{1 - \sum_{i=-M}^{M} \beta_i z^{-T+i}} \quad (23)$$

and an estimated value is generated using a zero-input response of the filter.

According to this configuration, it is possible to decode a code that is coded using the method of preventing collapse of the harmonic structure caused with the estimated value of $S2(k)$ and thereby obtain the effect that decodes the estimated value of the spectrum with improved quality.

Moreover, a fourth mode of the spectrum decoding method of the present invention adopts the above described configuration in which $M=0$, $\beta_0=1$ are assumed.

According to this configuration, since it is possible to decode a code that is coded by estimating the spectrum based on the filter whose characteristic is defined only by pitch coefficient T and thereby obtain the effect that the estimated value of the spectrum can be decoded at a low bit rate.

Furthermore, a fifth mode of the spectrum decoding method of the present invention has a configuration in which the outline of the spectrum is decoded for each subband determined by pitch coefficient T.

According to this configuration, the spectral outline calculated for each subband having an appropriate bandwidth can be decoded, and therefore it is possible to prevent discontinuity of energy of the spectrum and improve quality.

Furthermore, a sixth mode of the spectrum decoding method of the present invention adopts the above described configuration in which the first signal is generated from a signal decoded in a lower layer or a signal obtained by upsampling this signal.

According to this configuration, it is possible to decode a code that is coded through hierarchical coding made up of a coding section with a plurality of layers and thereby obtain the effect that a decoded signal can be obtained at a low bit rate and with high quality.

The acoustic signal transmission apparatus of the present invention adopts a configuration comprising an acoustic input apparatus that converts an acoustic signal such as a music sound and voice to an electric signal, an A/D conversion apparatus that converts a signal output from an acoustic input section to a digital signal, a coding apparatus that performs coding using a method including one spectral coding scheme according to one of claims 1 to 6 which performs coding on the digital signal output from this A/D conversion apparatus, an RF modulation apparatus that performs modulation processing or the like on the code output from this acoustic coding apparatus and a transmission antenna that converts a signal output from this RF modulation apparatus to a radio wave and transmits the signal.

According to this configuration, it is possible to provide a coding apparatus that performs coding efficiently with a small number of bits.

The acoustic signal decoding apparatus of the present invention adopts a configuration including a reception antenna that receives a reception radio wave, an RF demodulation apparatus that performs demodulation processing on the signal received from the reception antenna, a decoding apparatus that performs decoding processing on information obtained by the RF demodulation apparatus using the method including one spectrum decoding method according to claims 7 to 12, a D/A conversion apparatus that D/A-converts the digital acoustic signal decoded by the acoustic decoding apparatus and an acoustic output apparatus that converts an electric signal output from the D/A conversion apparatus to an acoustic signal.

According to this configuration, it is possible to decode a coded acoustic signal efficiently with a small number of bits and thereby output a high quality hierarchical signal.

The communication terminal apparatus of the present invention adopts a configuration comprising at least one of the above described acoustic signal transmission apparatuses or above described acoustic signal reception apparatuses. The base station apparatus of the present invention adopts a configuration comprising at least one of the above described acoustic signal transmission apparatuses or above described acoustic signal reception apparatuses.

According to this configuration, it is possible to provide a communication terminal apparatus or a base station apparatus that codes an acoustic signal efficiently with a small number of bits. Furthermore, this configuration can also provide a communication terminal apparatus or base station apparatus capable of decoding a coded acoustic signal efficiently with a small number of bits.

This application is based on Japanese Patent Application No. 2003-363080 filed on Oct. 23, 2003, entire content of which is expressly incorporated by reference herein.

INDUSTRIAL APPLICABILITY

The present invention can code a spectrum at a low bit rate and with high quality and is suitable for use in a transmission apparatus or reception apparatus or the like. Further, applying the present invention to hierarchical coding enables a voice signal or audio signal to be coded at a low bit rate and with high quality, which is suitable for use in a mobile station apparatus, base station apparatus or the like in a mobile communication system.

Figures 1A, 1B, 1C, 1D:
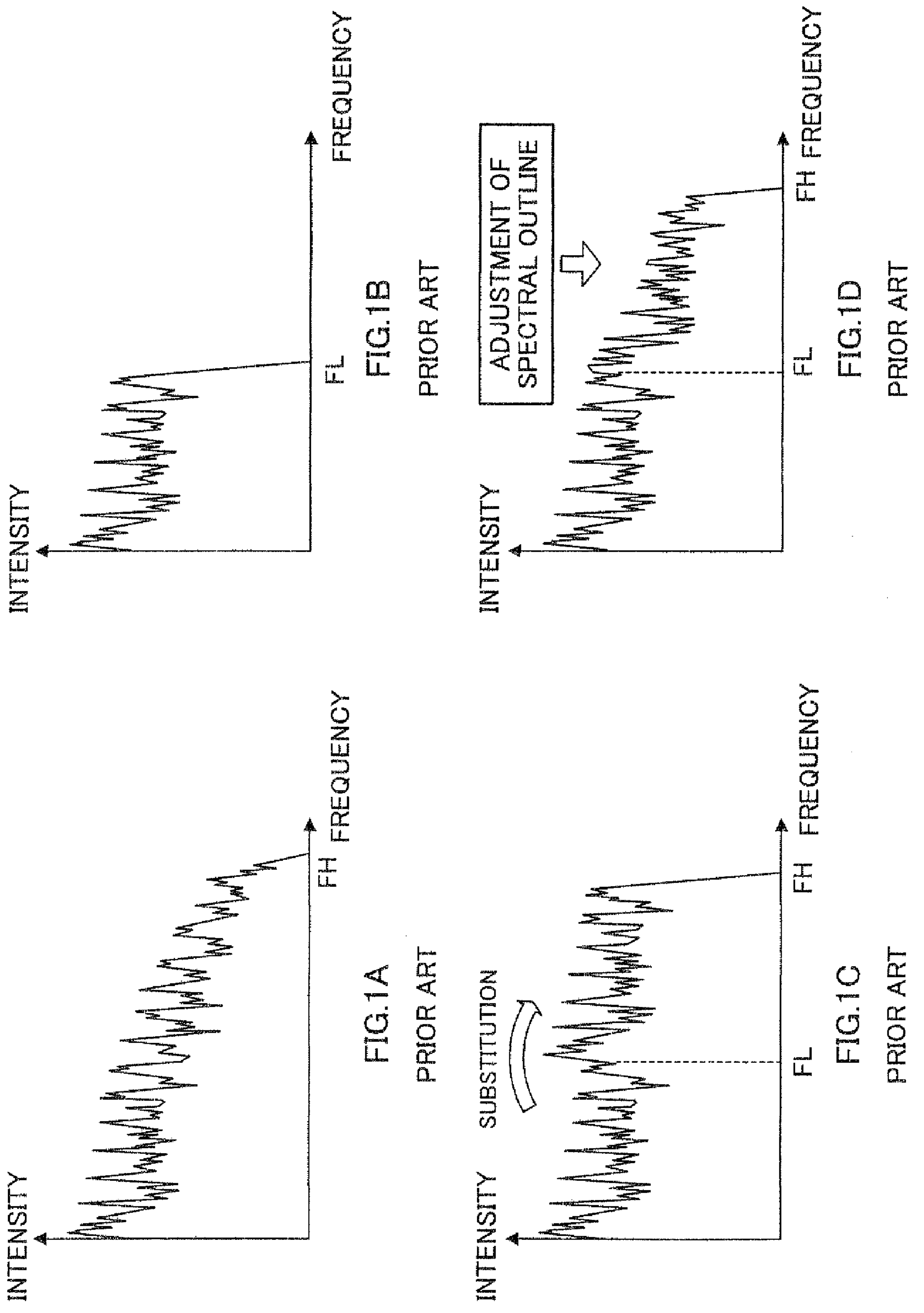
FIG.1B PRIOR ART
FIG.1D PRIOR ART
FIG.1A PRIOR ART
FIG.1C PRIOR ART
FIG. 1A shows a conventional bit rate compression technique.
FIG. 1B shows a conventional bit rate compression technique.
FIG. 1C shows a conventional bit rate compression technique.
FIG. 1D shows a conventional bit rate compression technique.
Figure 2A:
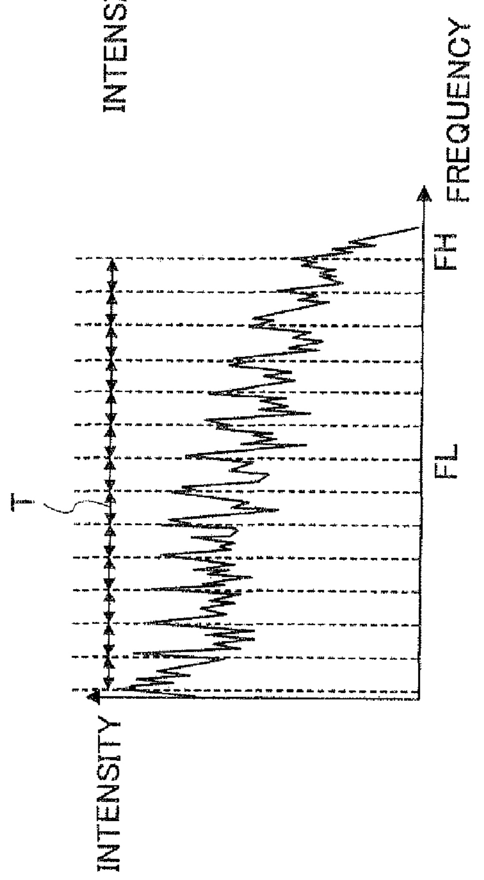
FIG. 2A shows a harmonic structure of a spectrum of a voice signal or audio signal.
Figure 2B:
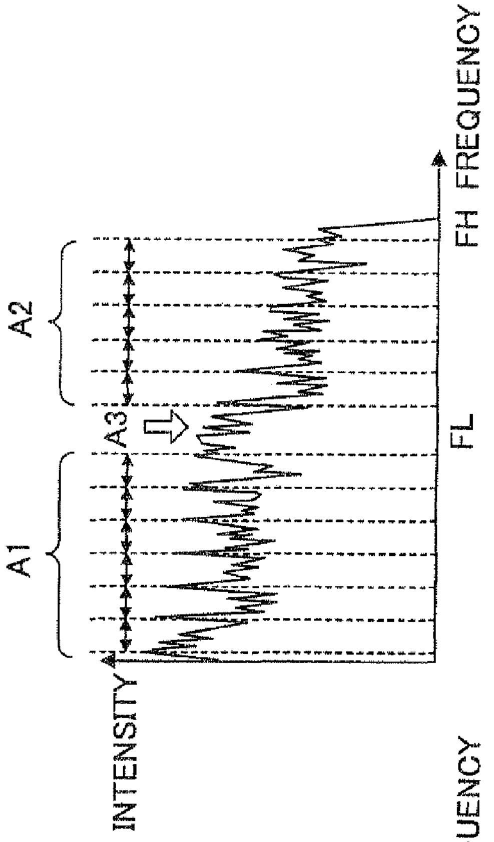
FIG. 2B shows a harmonic structure of a spectrum of a voice signal or audio signal.

[FIG. 1A]
INTENSITY
FREQUENCY
[FIG. 1B]
INTENSITY
FREQUENCY
[FIG. 1C]
INTENSITY
SUBSTITUTION
FREQUENCY
[FIG. 1D]
INTENSITY
ADJUSTMENT OF SPECTRAL OUTLINE
FREQUENCY
[FIG. 2A]
INTENSITY
FREQUENCY
[FIG. 2B]
INTENSITY

Figures 3A, 3B:
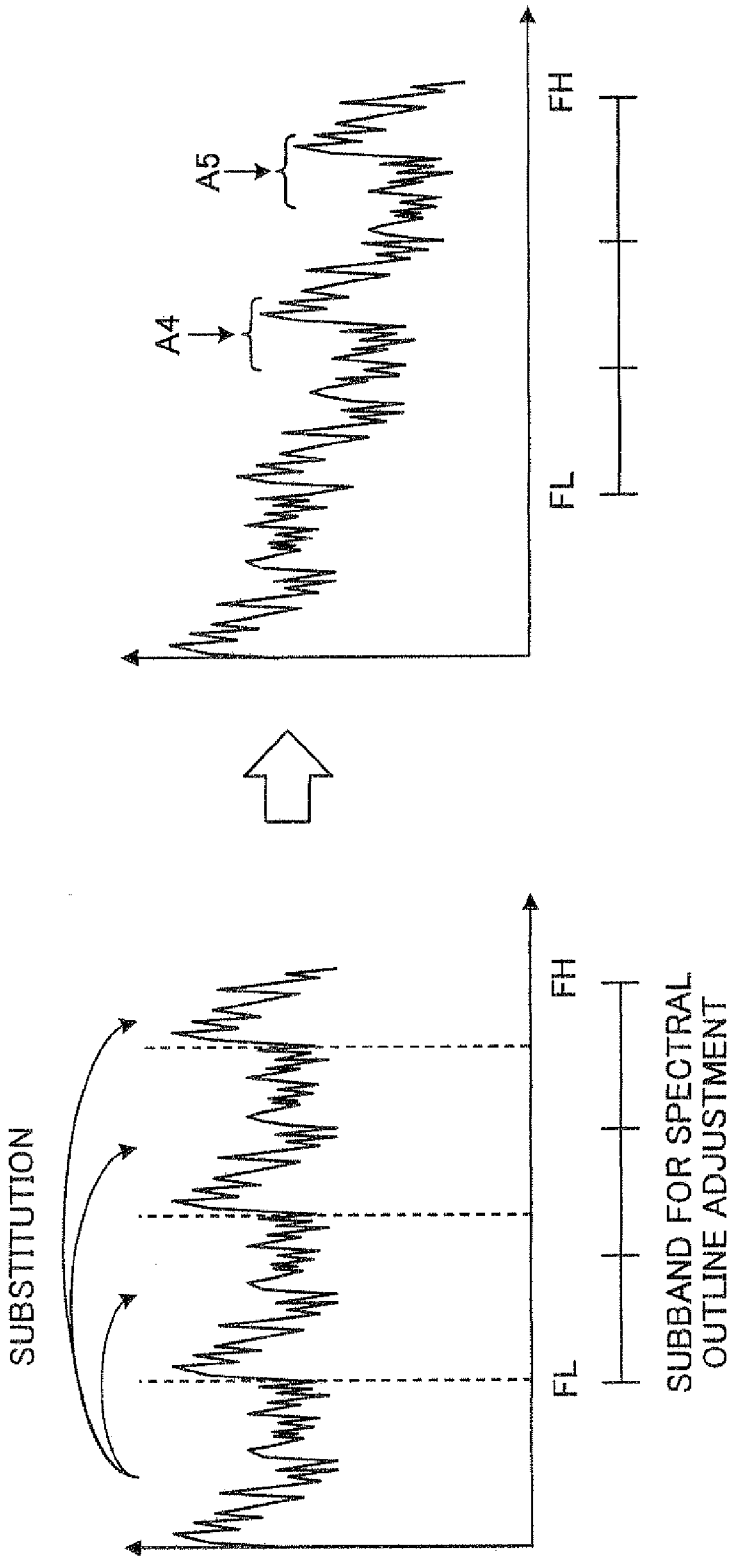
FIG. 3A shows discontinuity of energy produced when adjusting the spectral outline.
FIG. 3B shows discontinuity of energy produced when adjusting the spectral outline.
Figures 8A, 8B, 8C, 8D, 8E:
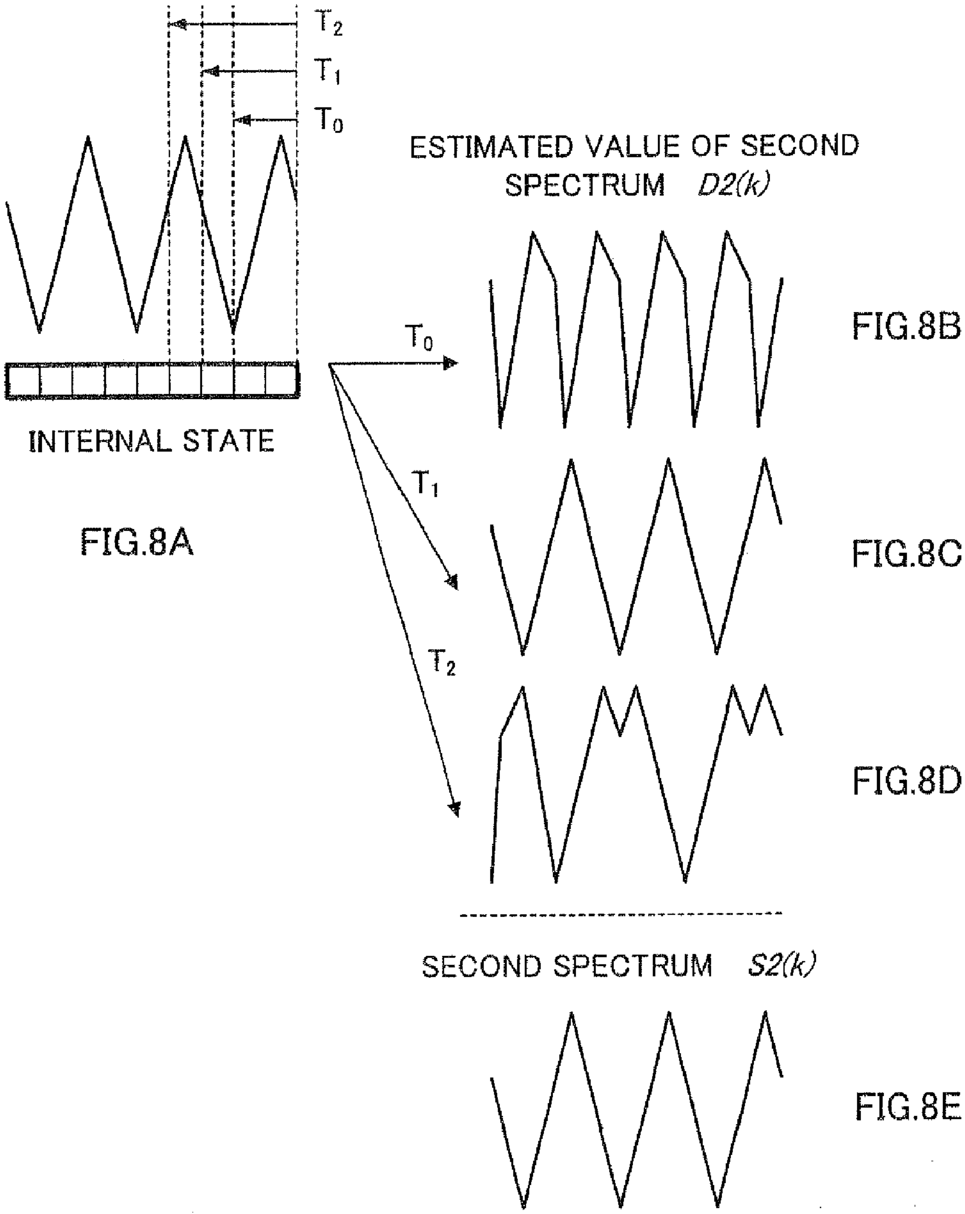
FIG. 8A shows another example of the harmonic structure of a first spectrum stored in the internal state.
FIG. 8B shows a further example of the harmonic structure of the first spectrum stored in the internal state.
FIG. 8C shows a still further example of the harmonic structure of the first spectrum stored in the internal state.
FIG. 8D shows a still further example of the harmonic structure of the first spectrum stored in the internal state.
FIG. 8E shows a still further example of the harmonic structure of the first spectrum stored in the internal state.

FREQUENCY
[FIG. 3A]
SUBSTITUTION
SUBBAND FOR SPECTRAL OUTLINE ADJUSTMENT
[FIG. 4]
100 SPECTRUM CODING APPARATUS
104•105 FREQUENCY DOMAIN TRANSFORMATION SECTION
106 INTERNAL STATE SETTING SECTION
109 PITCH COEFFICIENT SETTING SECTION
107 FILTERING SECTION
108 SEARCH SECTION
110 FILTER COEFFICIENT CALCULATION SECTION
115 SECOND SPECTRUM ESTIMATED VALUE GENERATION SECTION
112 SPECTRAL OUTLINE ADJUSTMENT SUBBAND DETERMINING SECTION
113 SPECTRAL OUTLINE ADJUSTMENT COEFFICIENT CODING SECTION
111 MULTIPLEXING SECTION
[FIG. 5]
INTERNAL STATE (FIRST SPECTRUM S1(*k*))
ESTIMATED VALUE OF SECOND SPECTRUM D2(*k*)
[FIG. 6]
START
ST1010 SET T=TMIN, Amax=0, Tmax=TMIN
ST1020 FILTERING PROCESSING
ST1030 CALCULATE DEGREE OF SIMILARITY A
ST1070 OUTPUT Tmax
END
[FIG. 7A]
INTERNAL STATE
[FIG. 7B]
ESTIMATED VALUE OF SECOND SPECTRUM D2(*k*)
[FIG. 7E]
SECOND SPECTRUM S2(*k*)
[FIG. 8A]
INTERNAL STATE
[FIG. 8B]
ESTIMATED VALUE OF SECOND SPECTRUM D2(*k*)
[FIG. 8E]
SECOND SPECTRUM S2(*k*)
[FIG. 9]
200 SPECTRUM CODING APPARATUS
203 FREQUENCY DOMAIN TRANSFORMATION SECTION
205 INTERNAL STATE SETTING SECTION
208 PITCH COEFFICIENT SETTING SECTION
206 FILTERING SECTION
207 SEARCH SECTION
209 SPECTRAL OUTLINE ADJUSTMENT SUBBAND DETERMINING SECTION
210 SPECTRAL OUTLINE ADJUSTMENT COEFFICIENT CODING SECTION
211 MULTIPLEXING SECTION
204 FREQUENCY DOMAIN TRANSFORMATION SECTION
[FIG. 10]
INTERNAL STATE (FIRST SPECTRUM S1(*k*))
ESTIMATED VALUE OF SECOND SPECTRUM D2(*k*)
[FIG. 11]
300 SPECTRUM CODING APPARATUS
303 FREQUENCY DOMAIN TRANSFORMATION SECTION
305 INTERNAL STATE SETTING SECTION
308 PITCH COEFFICIENT SETTING SECTION
306 FILTERING SECTION
307 SEARCH SECTION
313 FILTER COEFFICIENT CALCULATION SECTION
317 SECOND SPECTRUM ESTIMATED VALUE GENERATION SECTION
314 SPECTRAL OUTLINE ADJUSTMENT COEFFICIENT CODING SECTION
315 MULTIPLEXING SECTION
304 FREQUENCY DOMAIN TRANSFORMATION SECTION
309 SUBBAND DIVISION SECTION
312 SUBBAND SELECTION SECTION
[FIG. 12]
INTENSITY
TO MULTIPLEXING SECTION
FREQUENCY
SUBBAND
[FIG. 13]
400 SPECTRUM CODING APPARATUS
403 FREQUENCY DOMAIN TRANSFORMATION SECTION
405 INTERNAL STATE SETTING SECTION
408 PITCH COEFFICIENT SETTING SECTION
406 FILTERING SECTION
407 SEARCH SECTION
413 SPECTRAL OUTLINE ADJUSTMENT COEFFICIENT CODING SECTION
414 MULTIPLEXING SECTION
404 FREQUENCY DOMAIN TRANSFORMATION SECTION
409 SUBBAND DIVISION SECTION
412 SUBBAND SELECTION SECTION
[FIG. 14]
500 SPECTRUM CODING APPARATUS
503 FREQUENCY DOMAIN TRANSFORMATION SECTION
506 LPC SPECTRUM CALCULATION SECTION
507 SPECTRAL TILT CORRECTION SECTION
511 INTERNAL STATE SETTING SECTION
514 PITCH COEFFICIENT SETTING SECTION
512 FILTERING SECTION
513 SEARCH SECTION
519 SPECTRAL TILT ASSIGNMENT SECTION
510 SPECTRAL TILT CORRECTION SECTION
520 SPECTRAL OUTLINE ADJUSTMENT COEFFICIENT CODING SECTION
521 MULTIPLEXING SECTION
504 FREQUENCY DOMAIN TRANSFORMATION SECTION
515 SUBBAND DIVISION SECTION
518 SUBBAND SELECTION SECTION
509 LPC SPECTRUM CALCULATION SECTION
508 LPC ANALYSIS SECTION
[FIG. 15]
600 SPECTRUM CODING APPARATUS
603 FREQUENCY DOMAIN TRANSFORMATION SECTION
605 SPECTRUM FLAT PART DETECTION SECTION
606 INTERNAL STATE SETTING SECTION
609 PITCH COEFFICIENT SETTING SECTION
607 FILTERING SECTION
608 SEARCH SECTION
614 SPECTRAL OUTLINE ADJUSTMENT COEFFICIENT CODING SECTION
615 MULTIPLEXING SECTION
604 FREQUENCY DOMAIN TRANSFORMATION SECTION
610 SUBBAND DIVISION SECTION

613 SUBBAND SELECTION SECTION
[FIG. 16]
700 SPECTRUM CODING APPARATUS
703 FREQUENCY DOMAIN TRANSFORMATION SECTION
705 INTERNAL STATE SETTING SECTION
707 SEARCH RANGE DETERMINING SECTION
708 PITCH COEFFICIENT SETTING SECTION
709 FILTERING SECTION
710 SEARCH SECTION
715 SPECTRAL OUTLINE ADJUSTMENT COEFFICIENT CODING SECTION
716 MULTIPLEXING SECTION
704 FREQUENCY DOMAIN TRANSFORMATION SECTION
711 SUBBAND DIVISION SECTION
714 SUBBAND SELECTION SECTION
[FIG. 17]
800 HIERARCHICAL CODING APPARATUS
802 DOWNSAMPLING SECTION
803 FIRST LAYER CODING SECTION
804 FIRST LAYER DECODING SECTION
807 MULTIPLEXING SECTION
806 DELAY SECTION
805 UPSAMPLING SECTION
101 SPECTRUM CODING SECTION
[FIG. 18]
800*a* HIERARCHICAL CODING APPARATUS
802 DOWNSAMPLING SECTION
803 FIRST LAYER CODING SECTION
804*a* FIRST LAYER DECODING SECTION
807 MULTIPLEXING SECTION
806 DELAY SECTION
805 UPSAMPLING SECTION
101 SPECTRUM CODING SECTION
[FIG. 19]
1000 SPECTRUM DECODING APPARATUS
1003 SEPARATION SECTION
1005 FREQUENCY DOMAIN TRANSFORMATION SECTION
1006 INTERNAL STATE SETTING SECTION
1007 FILTERING SECTION
1008 SPECTRAL OUTLINE ADJUSTMENT SUBBAND DETERMINING SECTION
1009 SPECTRAL OUTLINE ADJUSTMENT COEFFICIENT DECODING SECTION
1010 SPECTRUM ADJUSTMENT SECTION
1011 TIME DOMAIN CONVERSION SECTION
[FIG. 20]
DECODED SPECTRUM D(k)
INTERNAL STATE (FIRST SPECTRUM S1 (*k*))
ESTIMATED VALUE OF SECOND SPECTRUM D2 (*k*)
[FIG. 21]
1100 SPECTRUM DECODING APPARATUS
1102 SEPARATION SECTION
1104 FREQUENCY DOMAIN TRANSFORMATION SECTION
1105 INTERNAL STATE SETTING SECTION
1106 FILTERING SECTION
1107 SPECTRAL OUTLINE ADJUSTMENT COEFFICIENT DECODING SECTION
1108 SPECTRUM ADJUSTMENT SECTION
1109 SUBBAND INTEGRATION SECTION
1110 TIME DOMAIN CONVERSION SECTION
[FIG. 22]
START
ST2210 PERFORM FREQUENCY TRANSFORMATION ON FIRST SIGNAL AND GENERATE FIRST SPECTRUM S1(*k*)
ST2220 SET INTERNAL STATE OF FILTER
ST2240 DECODE SPECTRUM OF jTH SUBBAND IN BAND FL≦k<FH THROUGH FILTERING
ST2250 ADJUST SPECTRUM OUTLINE OF jTH SUBBAND IN BAND FL≦k<FH.
ST2280 COMBINE FIRST SPECTRUM AND j SUBBAND SPECTRA
ST2290 CONVERT DECODED SPECTRUM TO TIME DOMAIN SIGNAL END
[FIG. 23]
1200 SPECTRUM DECODING APPARATUS
1202 SEPARATION SECTION
1204 FREQUENCY DOMAIN TRANSFORMATION SECTION
1205 INTERNAL STATE SETTING SECTION
1206 FILTERING SECTION
1210 LPC COEFFICIENT DECODING SECTION
1208 SPECTRAL OUTLINE ADJUSTMENT COEFFICIENT DECODING SECTION
1216 LPC SPECTRUM CALCULATION SECTION
1209 SPECTRAL TILT ASSIGNMENT SECTION
1211 LPC SPECTRUM CALCULATION SECTION
1207 SPECTRUM ADJUSTMENT SECTION
1212 SUBBAND INTEGRATION SECTION
1213 TIME DOMAIN CONVERSION SECTION
[FIG. 24]
1300 SPECTRUM DECODING APPARATUS
1302 SEPARATION SECTION
1303 COEFFICIENT Tmax GENERATION SECTION
1305 FREQUENCY DOMAIN TRANSFORMATION SECTION
1306 INTERNAL STATE SETTING SECTION
1307 FILTERING SECTION
1308 SPECTRAL OUTLINE ADJUSTMENT COEFFICIENT DECODING SECTION
1309 SPECTRUM ADJUSTMENT SECTION
1310 SUBBAND INTEGRATION SECTION
1311 TIME DOMAIN CONVERSION SECTION
[FIG. 25]
1400 HIERARCHICAL DECODING APPARATUS
1402 SEPARATION SECTION
1403 FIRST LAYER DECODING SECTION
1405 UPSAMPLING SECTION
1001 SPECTRUM DECODING SECTION
[FIG. 26]
1400*a* HIERARCHICAL DECODING APPARATUS
1402 SEPARATION SECTION
1403 FIRST LAYER DECODING SECTION
1405 UPSAMPLING SECTION
1001 SPECTRUM DECODING SECTION
[FIG. 27]
1502 INPUT APPARATUS
1503 A/D CONVERSION APPARATUS
1504 ACOUSTIC CODING APPARATUS
[FIG. 28]
1602 RECEPTION APPARATUS
1603 ACOUSTIC DECODING APPARATUS
1605 OUTPUT APPARATUS
1604 D/A CONVERSION APPARATUS
[FIG. 29]
1702 INPUT APPARATUS
1703 A/D CONVERSION APPARATUS
1704 ACOUSTIC CODING APPARATUS
1705 RF MODULATION APPARATUS

[FIG. 30]

1803 RF DEMODULATION APPARATUS

1804 ACOUSTIC DECODING APPARATUS

1806 OUTPUT APPARATUS

1805 D/A CONVERSION APPARATUS

The invention claimed is:

1. A spectrum coding apparatus comprising:

an acquisition section that acquires a first spectrum which frequency is in a band of $0 \leqq k<FL$;

an acquisition section that acquires a second spectrum which frequency is in a band of $0 \leqq k<FH$;

an estimation section that generates an estimated spectrum of said second spectrum in a band of $FL \leqq k<FH$, using said first spectrum, based on a pitch coefficient; and a coding section that divides said second spectrum in the band of $FL \leqq k<FH$ into a plurality of subbands and finds said pitch coefficient minimizing a distortion between said second spectrum and said estimated spectrum for each of said subbands, to estimate said second spectrum and code said pitch coefficient for each of said subbands.

2. The spectrum coding apparatus according to claim 1, wherein said coding section finds said pitch coefficient using said first spectrum smoothed using its spectrum envelope.

3. The spectrum coding apparatus according to claim 1, wherein said coding section divides said second spectrum into subbands of a bandwidth determined based on said pitch coefficient, and codes said pitch coefficient for each of said subbands.

4. An acoustic signal transmission apparatus comprising:

an acoustic input section converts an acoustic signal to an electric signal;

an A/D conversion section that converts a signal output from said acoustic input section to a digital signal;

a coding apparatus according to claim 1 that receives said digital signal output from said A/D conversion section as an input signal;

an RF modulation section that modulates the code output from said coding apparatus into a radio frequency signal; and a transmission antenna that converts the signal output from said RF modulation section to a radio wave and transmits the radio wave.

5. A communication terminal apparatus comprising the acoustic signal transmission apparatus of claim 4.

6. A base station apparatus comprising the acoustic signal transmission apparatus of claim 4.

7. A spectrum decoding apparatus comprising: an acquisition section that acquires a first spectrum which frequency is in a band of $0 \leqq k<FL$; and a decoding section that acquire a pitch coefficient of said first spectrum, calculated in a spectrum coding apparatus and minimizing a distortion between a high band which frequency is in a band of $FL \leqq k<FH$ in a second spectrum which frequency is in a band of $0 \leqq k<EH$ and an estimated spectrum estimated using said first spectrum, divides said second spectrum in the band of $FL \leqq k<FH$ into a plurality of subbands, and generates an estimated spectrum of said second spectrum for each said subbands using said first spectrum and said pitch coefficient for each of said subbands.

8. The spectrum decoding apparatus according to claim 7, wherein said decoding section generates said estimated spectrum of said second spectrum using said pitch coefficient and said first spectrum smoothed using its spectrum envelope.

9. The spectrum decoding apparatus according to claim 7, wherein said decoding section divides said second spectrum into subbands of a bandwidth determined based on said pitch coefficient, and generates said estimated spectrum of said second spectrum using said pitch coefficient and said first spectrum.

10. An acoustic signal reception apparatus comprising:

a reception antenna that receives a radio wave;

an RF demodulation section that demodulates the signal received at said reception antenna;

a decoding apparatus according to claim 7 that receives information acquired in said RE demodulation section as input and decodes said information;

a D/A conversion section that converts the signal output from said spectrum decoding apparatus to an analog signal; and an acoustic output section that converts an electric signal output from said D/A conversion section to an acoustic signal.

11. A communication terminal apparatus comprising the acoustic signal reception apparatus of claim 10.

12. A base station apparatus comprising the acoustic signal reception apparatus of claim 10.

13. A spectrum coding method comprising the steps of:

acquiring a first spectrum which frequency is in a band of $0 \leqq k<FL$;

acquiring a second spectrum which frequency is in a band of $0 \leqq k<FH$;

generating an estimated spectrum of said second spectrum in a band of $FL \leqq k<FH$, using said first spectrum, based on a pitch coefficient; and dividing said second spectrum in the band of $FL \leqq k<FH$ into a plurality of subbands and finding said pitch coefficient minimizing a distortion between said second spectrum and said estimated spectrum for each of said subbands, to estimate said second spectrum and code said pitch coefficient for each of said subbands.

14. The spectrum coding method according to claim 13, wherein said pitch coefficient is found using said first spectrum smoothed using its spectrum envelope.

15. The spectrum coding method according to claim 13, wherein said second spectrum is divided into subbands of a bandwidth determined based on said pitch coefficient, and said pitch coefficient is coded for each of said subbands.

16. A spectrum decoding method comprising the steps of:

acquiring a first spectrum which frequency is in a band of $0 \leqq k<FL$; and acquiring a pitch coefficient of said first spectrum, calculated in a spectrum coding apparatus and minimizing a distortion between a high band which frequency is in a band of $FL \leqq k<FH$ in a second spectrum which frequency is in a band of $0 \leqq k<FH$ and an estimated spectrum estimated using said first spectrum, dividing said second spectrum in the band of $FL \leqq k<FH$ into a plurality of subbands, and generating an estimated spectrum of said second spectrum for each said subbands using said first spectrum and said pitch coefficient for each of said subbands.

17. The spectrum decoding apparatus according to claim 16, wherein said estimated spectrum of said second spectrum is generated using said pitch coefficient and said first spectrum smoothed using its spectrum envelope.

18. The spectrum decoding method according to claim 16, wherein said second spectrum is divided into subbands of a bandwidth determined based on said pitch coefficient, and said estimated spectrum of said second spectrum is generated using said pitch coefficient and said first spectrum.

* * * * *

UNITED STATES PATENT AND TRADEMARK OFFICE

CERTIFICATE OF CORRECTION

PATENT NO. : 8,315,322 B2
APPLICATION NO. : 13/088392
DATED : November 20, 2012
INVENTOR(S) : Masahiro Oshikiri It is certified that error appears in the above-identified patent and that said Letters Patent is hereby corrected as shown below:

Title Page, Item (75) Inventor reads:

“Masahiro Oshikiri, Yokosuka (JP)”

and should read:

“Masahiro Oshikiri, Yokosuka-shi (JP)”.

Title Page 2, Item (56) References Cited, Foreign Patent Documents, column 2, line 1, cites the following reference a second time:

“WO WO 01/56021 8/2001”

and should be removed.

Title Page 2, Item (56) References Cited, Other Publications, column 2, line 8 reads:

“M. Oshikiri, et al, “Efficient Spectrum Coding for Super-Wideband”

and should read:

“M. Oshikiri, et al., “Efficient Spectrum Coding for Super-Wideband”.

Signed and Sealed this
Eighth Day of April, 2014

Michelle K. Lee
*Deputy Director of the United States Patent and Trademark Office*